US012659472B2

(12) United States Patent
Chen et al.

(10) Patent No.: US 12,659,472 B2
(45) Date of Patent: Jun. 16, 2026

(54) NETWORK BASED IMAGE FILTERING FOR VIDEO CODING

(71) Applicant: BEIJING DAJIA INTERNET INFORMATION TECHNOLOGY CO., LTD., Beijing (CN)

(72) Inventors: Wei Chen, San Diego, CA (US); Xiaoyu Xiu, San Diego, CA (US); Yi-Wen Chen, San Diego, CA (US); Hong-Jheng Jhu, San Diego, CA (US); Che-Wei Kuo, Beijing (CN); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 12 days.

(21) Appl. No.: 18/385,888

(22) Filed: Oct. 31, 2023

(65) Prior Publication Data

US 2024/0064296 A1 Feb. 22, 2024

Related U.S. Application Data

(63) Continuation of application No. PCT/US2022/027346, filed on May 2, 2022.

(Continued)

(51) Int. Cl.
*H04N 19/117* (2014.01)
*G06V 10/82* (2022.01)
(Continued)

(52) U.S. Cl.
CPC .......... *H04N 19/117* (2014.11); *G06V 10/82* (2022.01); *H04N 19/124* (2014.11); *H04N 19/59* (2014.11); *H04N 19/80* (2014.11)

(58) Field of Classification Search
CPC .... H04N 19/117; H04N 19/124; H04N 19/59; H04N 19/80; G06V 10/82
(Continued)

(56) References Cited

U.S. PATENT DOCUMENTS

2020/0068200 A1* 2/2020 Galpin ................. H04N 19/196
2020/0213587 A1 7/2020 Galpin et al.
(Continued)

FOREIGN PATENT DOCUMENTS

CN 111194555 A 5/2020
KR 1020200000543 A 1/2020

OTHER PUBLICATIONS

First Office Action issued for corresponding Japanese Patent Application 2023-567162 mailed on Oct. 22, 2024. with English translation, (9p).

(Continued)

*Primary Examiner* — Jayanti K Patel
*Assistant Examiner* — Richard B Carter
(74) *Attorney, Agent, or Firm* — Arch & Lake LLP; Han Tan; Shen Wang

(57) ABSTRACT

A method and an apparatus for image filtering in video coding using a neural network are provided. The method includes: loading, a plurality of quantization parameter (QP) map (QpMap) values at a plurality of QpMap channels into the neural network; obtaining a QP scaling factor by adjusting a plurality of input QP values related to an input frame; and adjusting, according to a QP scaling factor, the plurality of QpMap values for the neural network to learn and filter the input frame to the neural network.

17 Claims, 15 Drawing Sheets

Load a plurality of quantization parameter (QP) map (QpMap) values at one or more QpMap channels into the neural network
1901

Obtain a QP scaling factor by adjusting a plurality of input QP values related to an input frame
1902

Adjust, according to the QP scaling factor, the plurality of QpMap values for the neural network to learn and filter the input frame to the neural network
1903

Related U.S. Application Data

(60) Provisional application No. 63/182,923, filed on May 1, 2021.

(51) Int. Cl.
  *H04N 19/124*    (2014.01)
  *H04N 19/59*    (2014.01)
  *H04N 19/80*    (2014.01)

(58) Field of Classification Search
  USPC ................................................... 375/240.29
  See application file for complete search history.

(56) References Cited

U.S. PATENT DOCUMENTS

| | | | | |
|---|---|---|---|---|
| 2020/0364552 | A1* | 11/2020 | Guo ........................ | H03M 7/24 |
| 2021/0099721 | A1 | 4/2021 | Tsukuba | |
| 2021/0144377 | A1* | 5/2021 | Lei ........................ | H04N 19/176 |
| 2022/0191553 | A1* | 6/2022 | Auyeung ............. | H04N 19/436 |

OTHER PUBLICATIONS

Xiaodan Song, et al., "A Practical Convolutional Neural Network as Loop Filter for Intra Frame" , 2018 25th IEEE International Conference on Image Processing (ICIP), (5p).

International Search Report issued for PCT Application No. PCT/US2022/027346, dated Aug. 18, 2022, (4p).

Cheung Au Yeung et al., 'EE1.1: A comparison of depthwise separable convolution and regular convolution with the JVET-T0057 neural network based in-loop filter', JVET-U0060, Joint Video Experts Team (JVET) of ITU-T SG 16 WP 3 and ISO/IEC JTC 1/SC 29, 21st Meeting, by teleconference, pp. 1-1 1, Jan. 7, 2021, (9p).

Yue Li et al., 'AHG11: Conditional li-Loop Filter with Parameter Selection', JVET-V0101-v2, Joint Video Experts Team (JVET) of ITU-T SG 16 WP 3 and ISO/IEC JTC 1/SC 29, 22nd Meeting, by teleconference, pp. 1-5, Apr. 20, 2021, (5p).

Hongtao Wang et al., 'AHG11: Neural Network-based fo-Loop Filter Performance with No Deblocking Filtering stage', JVET-U0115-v2, Joint Video Experts Team (JVET) of ITU-T SG 16 WP 3 and ISO/IEC JTC 1/SC 29, 21st Meeting, by teleconference, pp. 1-5, Jan. 8, 2021, (5p).

JPOA issued in Application No. 2023-567162 dated May 7, 2025 with English translation, (5p).

EPOA issued in Application No. 22799386.2 dated May 19, 2025, (15p).

Tsung-Chuan Ma et al, "AHG11: In-loop filtering based on neutral network", Joint Video Experts Team (JVET) of ITU-T SG 16 WP 3 and ISO/IEC JTC 1/SC 29, JVET-T0094, 20th Meeting, by teleconference, Oct. 7-16, 2020, (3p).

Wei Chen et al., "EE-2.1.5: In-loop filtering based on neural network", Joint Video Experts Team (JVET) of ITU-T SG 16 WP 3 and ISO/IEC JTC 1/SC 29, JVET-U0101, 21st Meeting, by teleconference, Jan. 6-15, 2021, (5p).

Wei Chen et al., "Quality-aware CNN-based in-loop filter for Video Coding", Proc. of SPIE vol. 11842 1184203, p. 1-8, (8p).

Merlin Paul et al., "Performance Improvement of HEVC Using Adaptive Quantization", 2014 International Conference on Advances in Computing, Communications and Informatics (ICACCI), p. 1428-1433, (6p).

First Office Action issued on Nov. 25, 2025 for counterpart Mexico patent application No. MX/a/2023/012820, along with the English translation, (7p).

First Office Action issued on Jan. 1, 2026 for counterpart Korean patent application No. 10-2023-7038785, along with the English translation, (11p).

Examination Report issued on Apr. 21, 2026 for counterpart Indian patent application No. 202317079369, (9p).

* cited by examiner

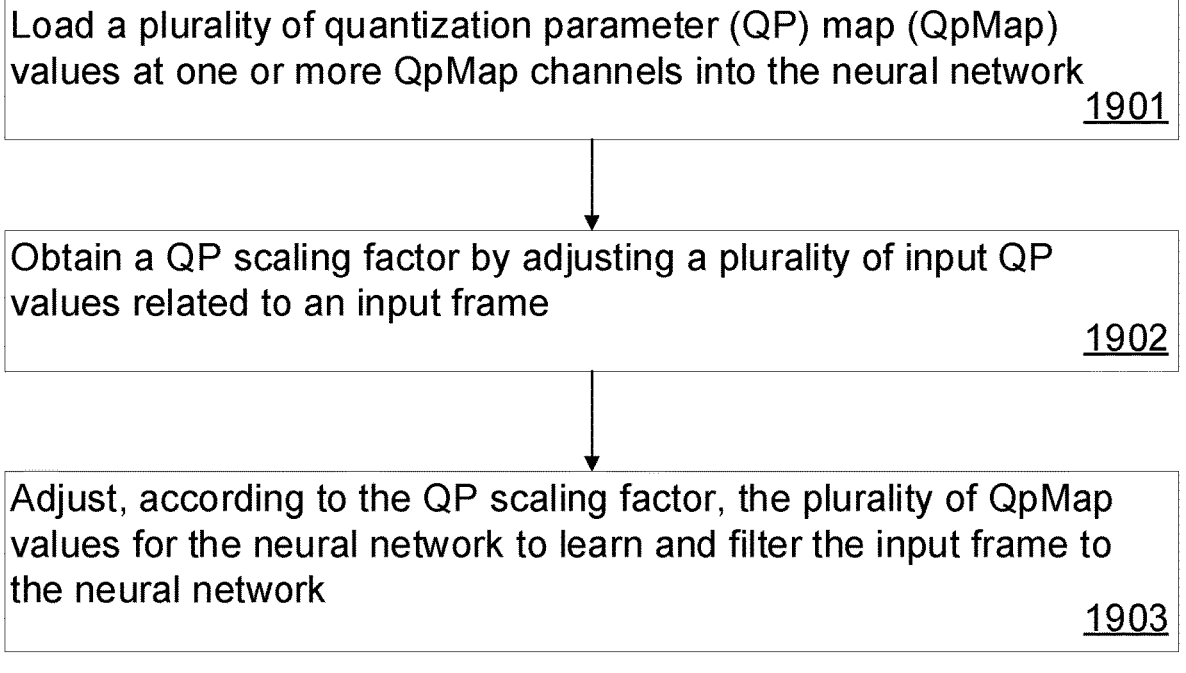

| Load a plurality of quantization parameter (QP) map (QpMap) values at one or more QpMap channels into the neural network |
|---|
| 1901 |

| Obtain a QP scaling factor by adjusting a plurality of input QP values related to an input frame |
|---|
| 1902 |

| Adjust, according to the QP scaling factor, the plurality of QpMap values for the neural network to learn and filter the input frame to the neural network |
|---|
| 1903 |

FIG. 19

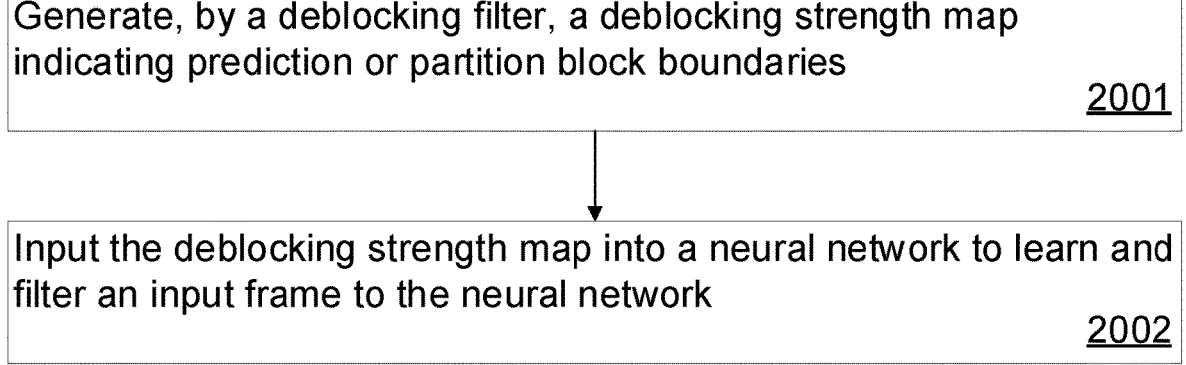

| Generate, by a deblocking filter, a deblocking strength map indicating prediction or partition block boundaries |
|---|
| 2001 |

| Input the deblocking strength map into a neural network to learn and filter an input frame to the neural network |
|---|
| 2002 |

FIG. 20

NETWORK BASED IMAGE FILTERING FOR VIDEO CODING

CROSS-REFERENCE TO RELATED APPLICATION

The present application is a continuation application of PCT Application No. PCT/US2022/027346, filed on May 2, 2022, which claims priority to U.S. Provisional Application No. 63/182,923, entitled "Neural Network Based Image Filtering for Video Coding," filed on May 1, 2021, the entirety of which is incorporated by reference for all purposes.

FIELD

The present disclosure relates to video coding, and in particular but not limited to, methods and apparatus on video coding using neural network-based model filtering.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

The joint call for proposals (CfP) on video compression with capability beyond HEVC was issued by ITU-T and ISO/IEC. 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). One reference software codebase, called VVC test model (VTM), was established for demonstrating a reference implementation of the VVC standard.

SUMMARY

The present disclosure provides examples of techniques relating to improving the video coding efficiency by using neural network-based model filtering.

According to a first aspect of the present disclosure, there is provided a method for image filtering in video coding using a neural network. The method includes: loading, a plurality of quantization parameter (QP) map (QpMap) values at one or more QpMap channels into the neural network, obtaining a QP scaling factor by adjusting a plurality of input QP values related to an input frame, and adjusting, according to the QP scaling factor, the plurality of QpMap values for the neural network to learn and filter the input frame to the neural network.

According to a second aspect of the present disclosure, there is provided a method for image filtering in video coding using a neural network. The method includes: generating, by a deblocking filter, a deblocking strength map indicating prediction or partition block boundaries, and inputting the deblocking strength map into a neural network to learn and filter an input frame to the neural network.

According to a third aspect of the present disclosure, there is provided an apparatus for image filtering in video coding using a neural network. The apparatus includes one or more processors and a memory configured to store instructions executable by the one or more processors. Further, the one or more processors, upon execution of the instructions, are configured to perform the method according to the first aspect.

According to a fourth aspect of the present disclosure, there is provided an apparatus for image filtering in video coding using a neural network. The apparatus includes one or more processors and a memory configured to store instructions executable by the one or more processors. Further, the one or more processors, upon execution of the instructions, are configured to perform the method according to the second aspect.

According to a fifth aspect of the present disclosure, there is provided a non-transitory computer-readable storage medium storing computer-executable instructions that, when executed by one or more computer processors, causing the one or more computer processors to perform the method according to the first aspect.

According to a sixth aspect of the present disclosure, there is provided a non-transitory computer-readable storage medium storing computer-executable instructions that, when executed by one or more computer processors, causing the one or more computer processors to perform the method according to the second aspect.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 19 is a flowchart illustrating a process for image filtering in video coding using a neural network in accordance with some implementations of the present disclosure.

FIG. 20 is a flowchart illustrating a process for image filtering in video coding using a neural network in accordance with some implementations of the present disclosure.

DETAILED DESCRIPTION

Figure 1:
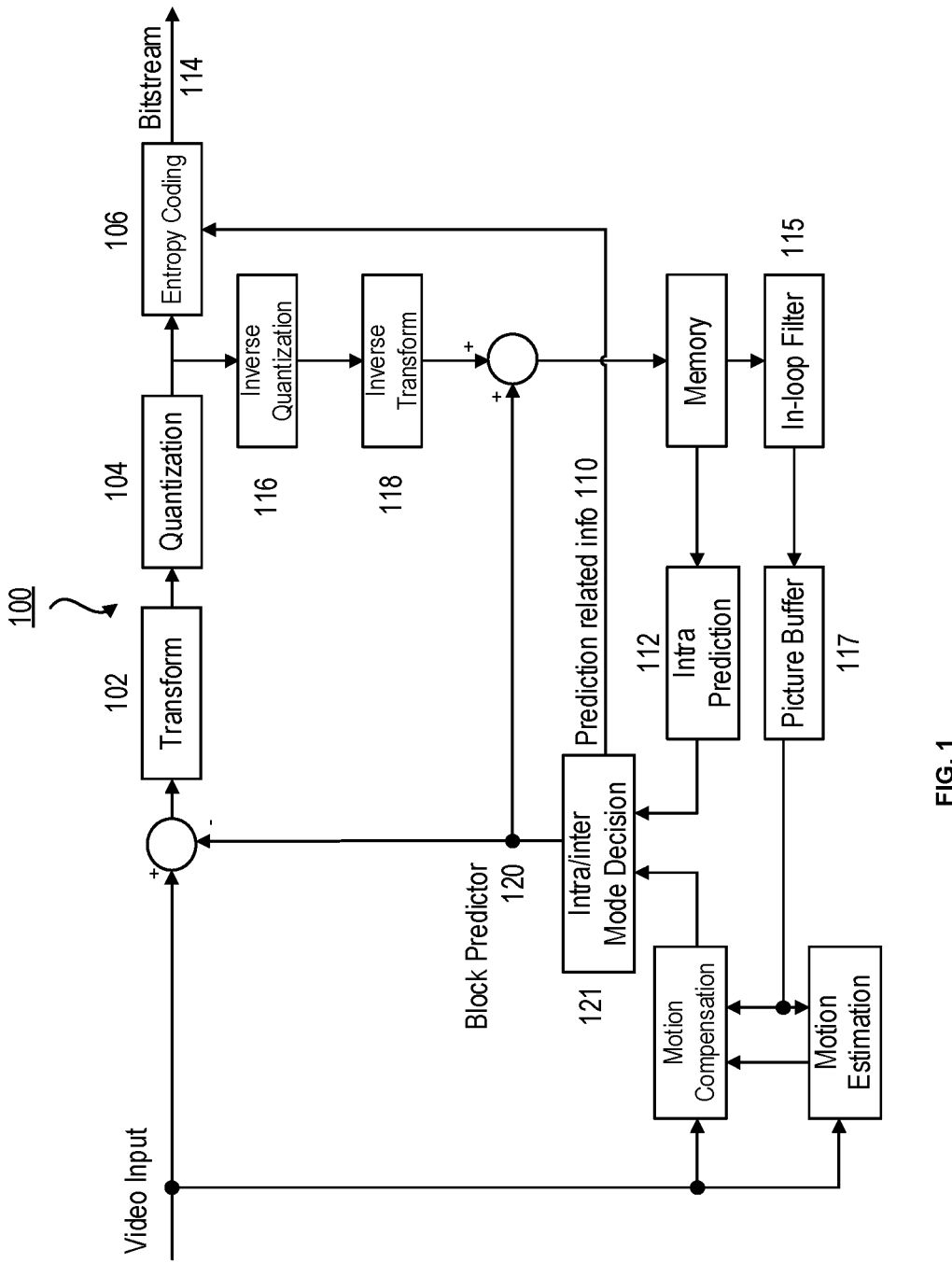
FIG. 1 is a block diagram illustrating a block-based video encoder in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Like HEVC, VVC is built upon the block-based hybrid video coding framework. FIG. 1 is a block diagram illustrating a block-based video encoder in accordance with some implementations of the present disclosure. In the encoder 100, the input video signal is processed block by block, called coding units (CUs). In VTM-1.0, a CU can be up to 128×128 pixels. However, different from the HEVC which partitions blocks only based on quad-trees, in VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

Figures 3A, 3B, 3C, 3D, 3E:
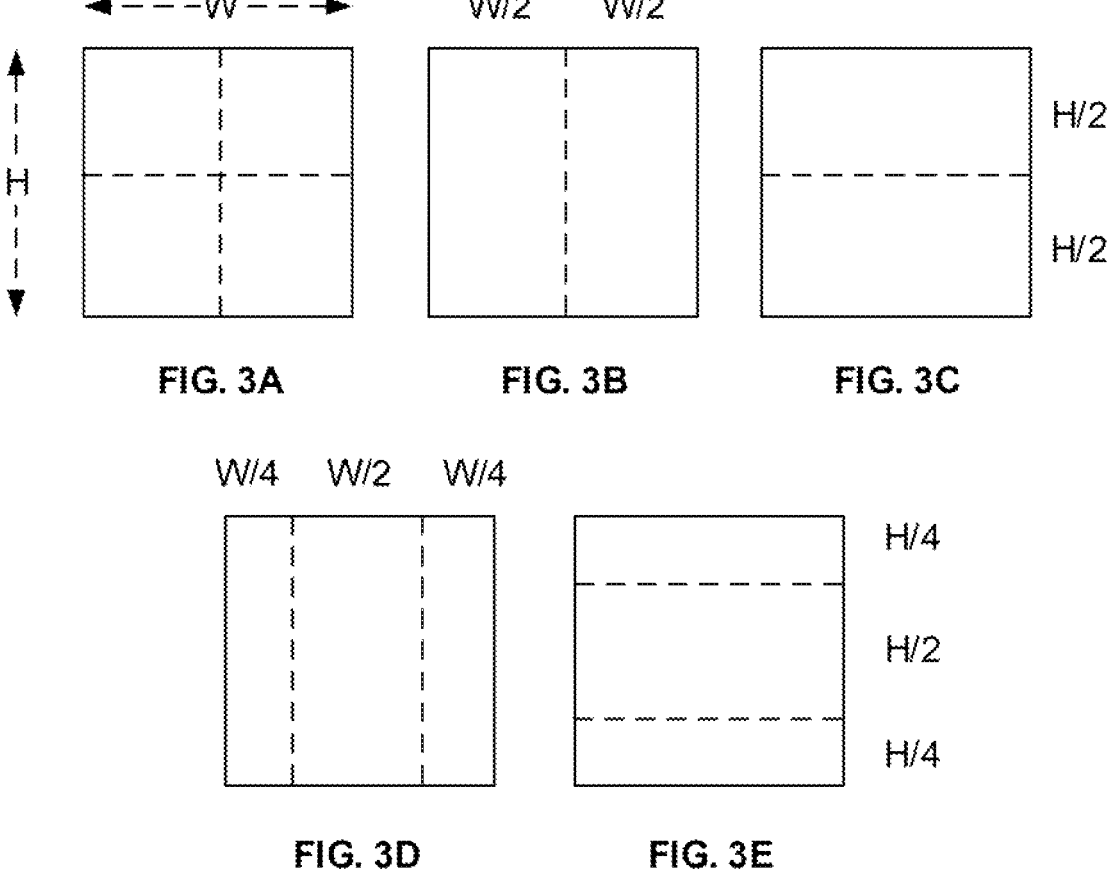
FIG. 3A is schematic diagram illustrating quaternary partitioning tree splitting mode in accordance with some implementations of the present disclosure.
FIG. 3B is schematic diagram illustrating vertical binary partitioning tree splitting mode in accordance with some implementations of the present disclosure.
FIG. 3C is schematic diagram illustrating horizontal binary partitioning tree splitting mode in accordance with some implementations of the present disclosure.
FIG. 3D is schematic diagram illustrating vertical ternary partitioning tree splitting mode in accordance with some implementations of the present disclosure.
FIG. 3E is schematic diagram illustrating horizontal ternary partitioning tree splitting mode in accordance with some implementations of the present disclosure.

FIGS. 3A-3E are schematic diagrams illustrating multi-type tree splitting modes in accordance with some implementations of the present disclosure. FIGS. 3A-3E respectively show five splitting types including quaternary partitioning (FIG. 3A), vertical binary partitioning (FIG. 3B), horizontal binary partitioning (FIG. 3C), vertical ternary partitioning (FIG. 3D), and horizontal ternary partitioning (FIG. 3E).

For each given video block, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes.

After spatial and/or temporal prediction, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU.

Further, in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO is defined to further improve coding efficiency. In the now-current version of the VVC standard, yet another in-loop filter called ALF is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
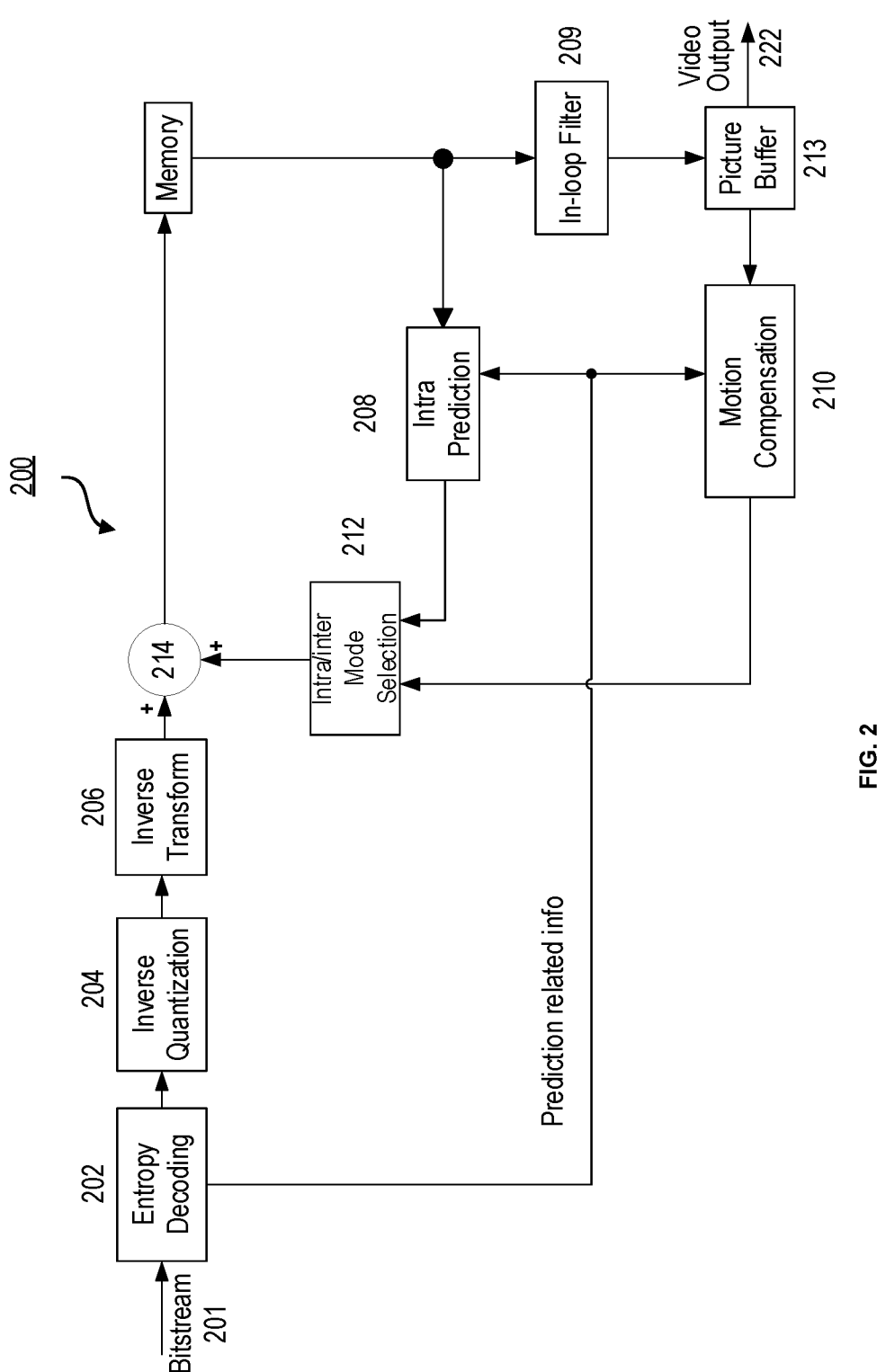
FIG. 2 is a block diagram illustrating a block-based video decoder in accordance with some implementations of the present disclosure.

FIG. 2 is a block diagram illustrating a block-based video decoder 200 which may be used in conjunction with many video coding standards. This decoder 200 is similar to the reconstruction-related section residing in the encoder 100 of FIG. 1. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

The present disclosure is to improve the image filtering design of the above-mentioned video coding standards or techniques. The proposed filtering method in the present disclosure is neural network based, which may be applied as part of the in-loop filtering, e.g., between the deblocking filter and sample adaptive offset (SAO), or as part of post-loop filtering to improve the current video coding techniques, or as part of post-processing filtering after the current video coding techniques.

The neural network techniques, e.g., fully connected neural network (FC-NN), convolutional neural network (CNN), and long short-term memory network (LSTM), have already achieved significant success in many research domains, including computer vision and video understanding.

7

Fully-Connected Neural Network (FC-NN)

Figure 4:
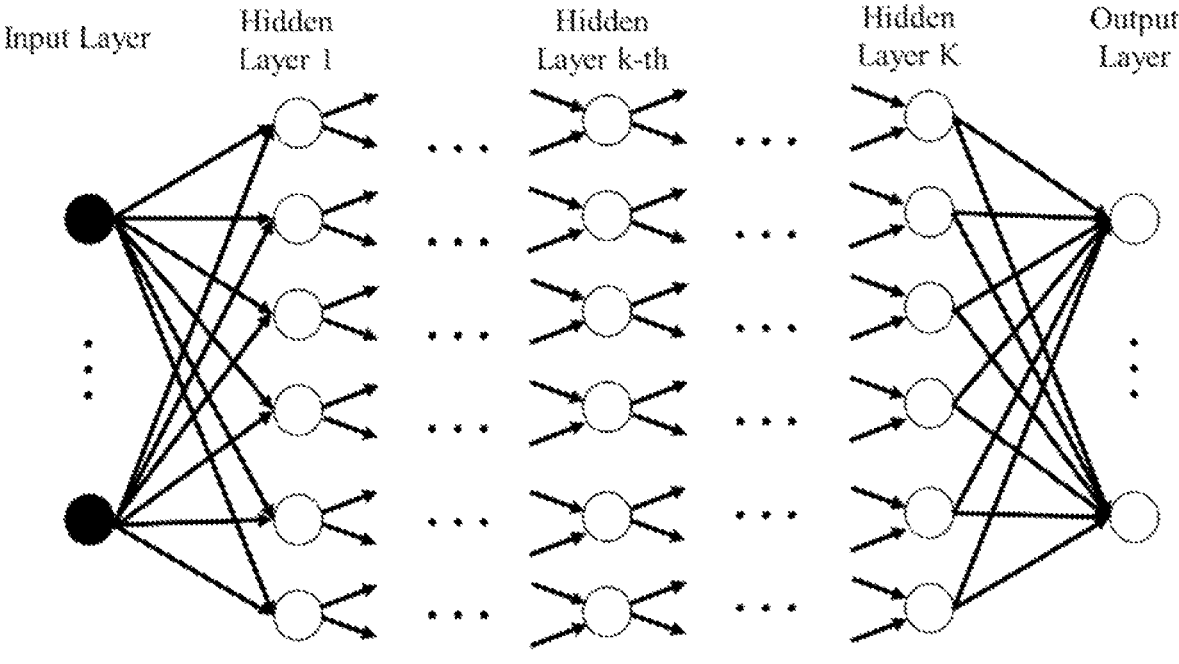
FIG. 4 illustrates a simple FC-NN consisting of input layer, output layer, and multiple hidden layers in accordance with some implementations of the present disclosure.

FIG. 4 illustrates a simple FC-NN consisting of input layer, output layer, and multiple hidden layers in accordance with some implementations of the present disclosure. At k-th layer, the output $f^k(x^{k-1}, W^k, B^k)$, is generated by $$f^k(x^{k-1}, W^k, B^k) = \delta(x^{k-1} * W^k + B^k) \tag{1}$$

$$x^{k-1} * W^k + B^k = [x_1^{k-1}, \dots, x_j^{k-1}, \dots, x_M^{k-1}] \cdot \begin{bmatrix} W_{1,1}^k & \cdots & W_{0,N}^k \\ \vdots & \ddots & \vdots \\ W_{M,1}^k & \cdots & W_{M,N}^k \end{bmatrix} + \tag{2}$$

$$[B_1^{k-1}, \dots, B_j^{k-1}, \dots, B_M^{k-1}]$$

where $x^{k-1} \in R^M$ is the output of (k−1)-th layer, $W^k \in R^{M*N}$ and $B^k \in R^N$ are the weight and the bias at k-th layer. $\delta(\cdot)$ is the activation function, e.g., the Rectified Linear Unit (ReLU) function as defined in Eq. (3).

$$\delta(x) = \begin{cases} 0, & x < 0 \\ x, & x \geq 0 \end{cases} \tag{3}$$

Therefore, the general form of a K-layer FC-NN is written as $$FCNN(x) = f^K(\dots f^k(f^{k-1}(\dots f^1(x, W^1, B^1) \dots)), \\ W^k, B^k) \dots, W^K, B^K), \text{ for } 1 \leq k \leq K \tag{4}$$

According to the universal approximation hypothesizes and Eq. (4), given any continuous function g(x) and some ε>0, there exists a neural network f(x) with a reasonable choice of non-linearity e.g., ReLU, such that ∀x, |g(x)−f(x) |<ε. Therefore, many empirical studies applied neural network as an approximator to mimic a model with hidden variables in order to extract explainable features under the surfaces. For example, applying in image recognition, FC-NN helps researchers to construct a system that understands not just a single pixel, but increasingly much deeper and complex sub-structures, e.g., edges, textures, geometric shapes, and objects.

Convolutional Neural Network (CNN)

Figure 5A:
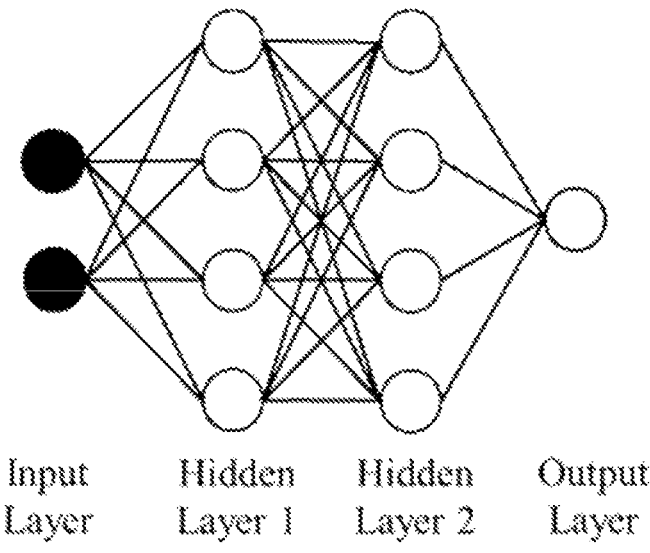
FIG. 5A illustrates an FC-NN with two hidden layers in accordance with some implementations of the present disclosure.
Figure 5B:
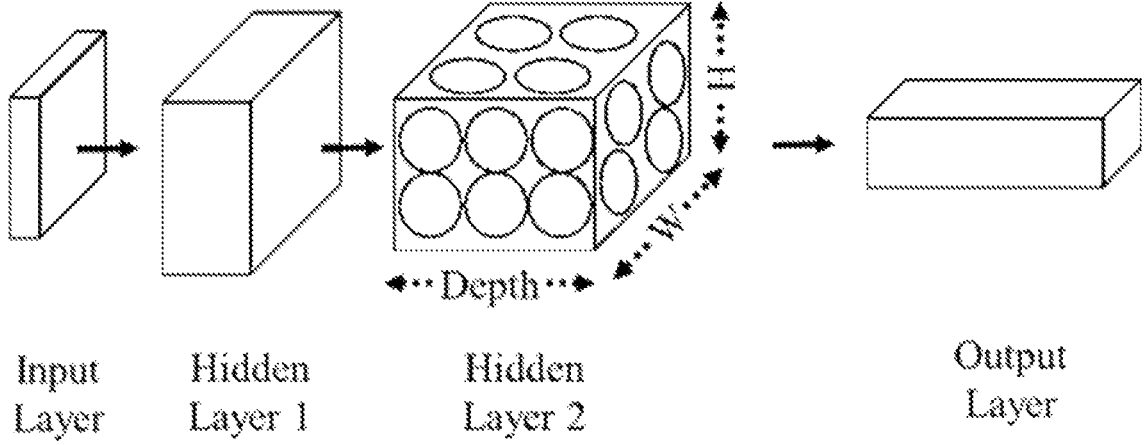
FIG. 5B illustrates an example of CNN in which the dimension of the second hidden layer is [W, H, Depth] in accordance with some implementations of the present disclosure.

FIG. 5A illustrates an FC-NN with two hidden layers in accordance with some implementations of the present disclosure. CNN, a popular neural network architecture for image or video applications, is very similar to the FC-NN as shown in FIG. 5A, which includes weights and bias metrices. A CNN can be seen as a 3-D version of neural network. FIG. 5B illustrates an example of CNN in which the dimension of the second hidden layer is [W, H, Depth] in accordance with some implementations of the present disclosure. In FIG. 5B, neurons are arranged in 3-Dimensional structure (width, height, and depth) to form a CNN, and the second hidden layer is visualized. In this example, the input layer holds input image or video frames therefore its width and height are same as input data. To apply with image or video applications, each neuron in CNN is a spatial filter element with extended depth aligned with its input, e.g., the depth is 3 if there are 3 color components in input images.

Figure 6:
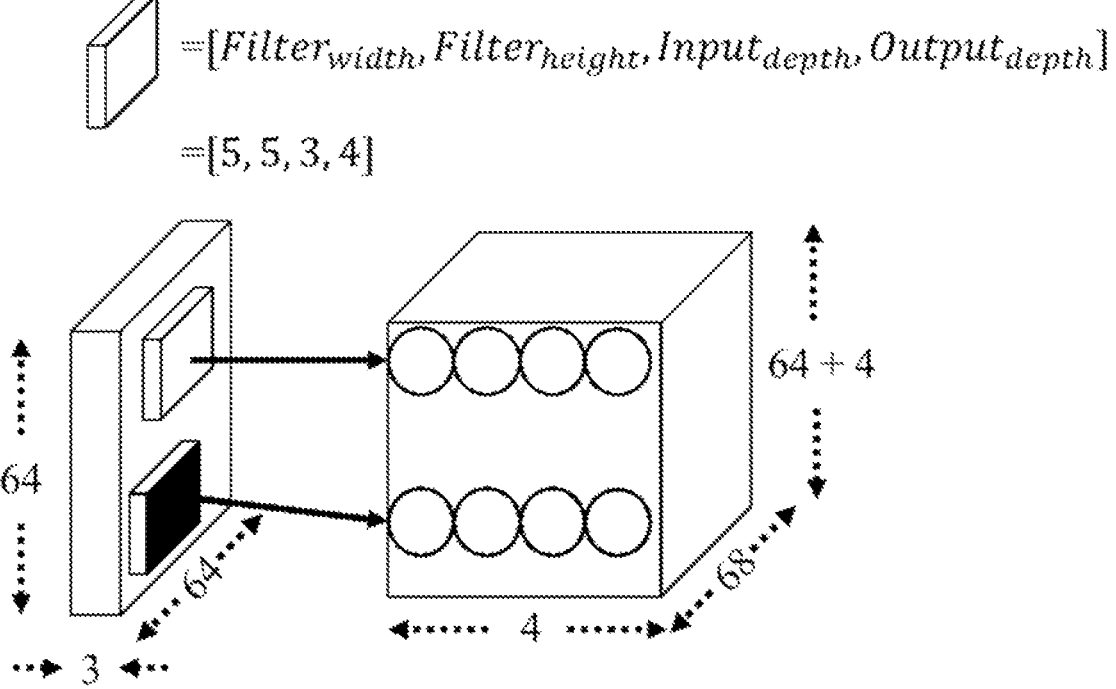
FIG. 6 illustrates an example of applying spatial filters with an input image in accordance with some implementations of the present disclosure.

FIG. 6 illustrates an example of applying spatial filters with an input image in accordance with some implementations of the present disclosure. As shown in FIG. 6, the dimension of basic element in CNN is defined as [Filter$_{width}$, Filter$_{height}$, Input$_{depth}$, Output$_{depth}$] and set to [5, 5, 3, 4] in this example. Each spatial filter performs 2-dimensional spatial convolution with 5*5*3 weights on an input image. The input image may be a 64×64×3 image. Then, 4 convolutional results are outputted. Therefore, the dimension of filtered results is [64+4, 64+4, 4] if padding the boundary with additional 2 pixels.

Residual Network (ResNet)

In image classification, the accuracy is saturated and degrades rapidly when the depth of neural network increases. To be more specifically, adding more layers on deep neural network results in higher training error because the gradient is gradually vanishing along the deep network and toward to zero gradient at the end. Then, the ResNet composed of residual blocks comes to resolve the degradation problem by introducing the identity connection.

Figure 7A:
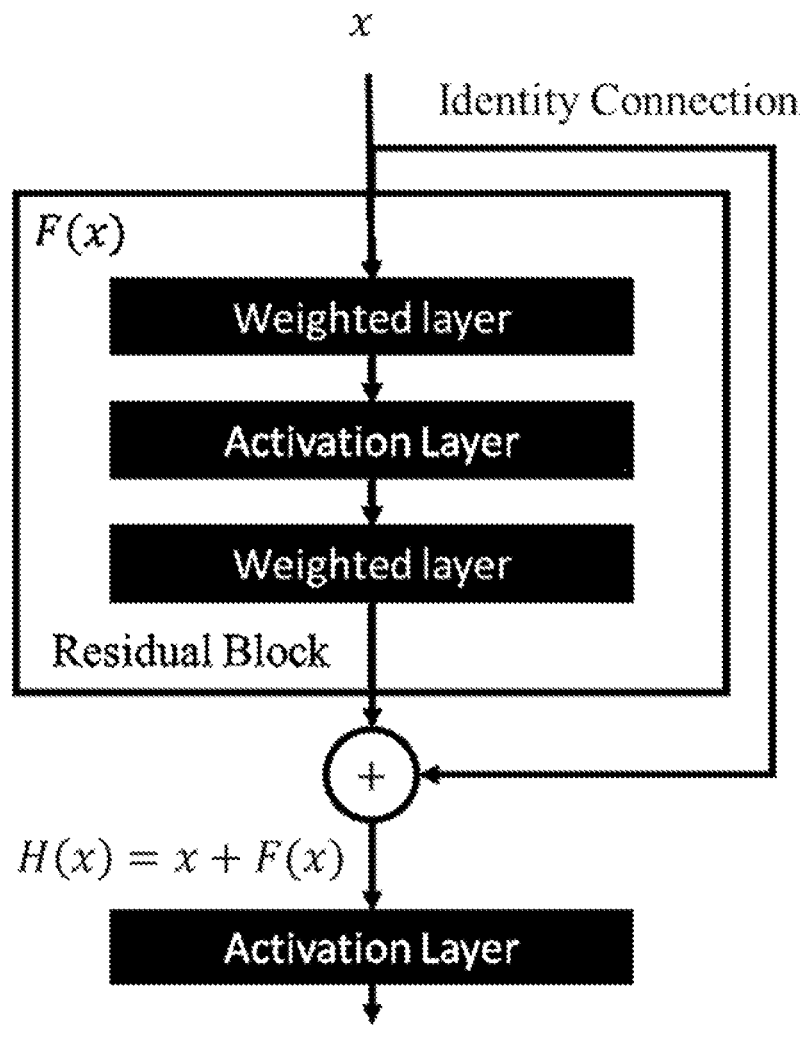
FIG. 7A illustrates a Residual Network (ResNet) including a residual block as the element of ResNet that is elementwise added with its input by identity connection in accordance with some implementations of the present disclosure.

FIG. 7A illustrates a ResNet including a residual block as the element of ResNet that is elementwise added with its input by identity connection in accordance with some implementations of the present disclosure. As shown in FIG. 7A, a basic module of ResNet is consist of the residual block and the identity connection. According to the universal approximation hypothesizes, given an input x, weighted layers with activation function in residual block approximate a hidden function F(x) rather than the output H (x)=F(x)+x.

By stacking non-linear multi-layer neural network, the residual block explores the features that represent the local characteristic of input images. Without introducing neither additional parameters and computational complexity, the identity connection is proven to make deep learning network trainable by skip one or more non-linear weighted layers as shown in FIG. 7A. Skipping weighted layers, the differential output of the residual layers can be written as $$\frac{\partial H(x)}{\partial x} = \frac{\partial F(x)}{\partial x} + 1 \tag{5}$$

Figure 7B:
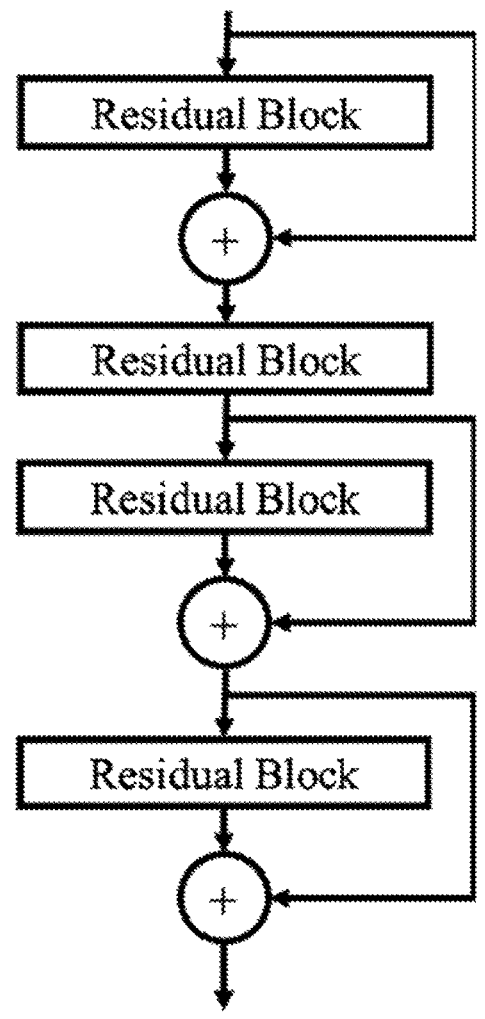
FIG. 7B illustrates an example of ResNet by stacking residual blocks in accordance with some implementations of the present disclosure.

Therefore, even if the differential term $$\frac{\partial F(x)}{\partial x}$$

is gradually decreasing toward zero, the identity term can still carry on and pass the input to next layer instead of stuck at zero gradient as well as blocking information propagation. If a neuron cannot propagate information to next neuron, it is seen as dead neuron, which is non-trainable element in neural network. After addition, another non-linear activation function can be applied as well. FIG. 7B illustrates an example of ResNet by stacking residual blocks in accordance with some implementations of the present disclosure. As shown in FIG. 7B, the residual features are fused with the identity features before propagating to the next module.

Variations of ResNet

Figure 8A:
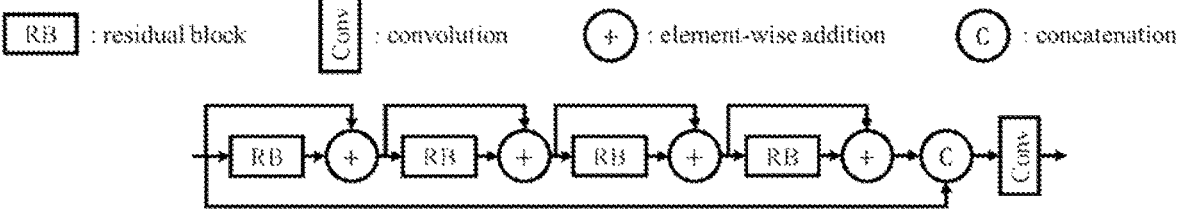
FIG. 8A illustrates an example of ResNet including a plurality of residual blocks with global identity connection in accordance with some implementations in the present disclosure.
Figures 8B, 8C, 9:
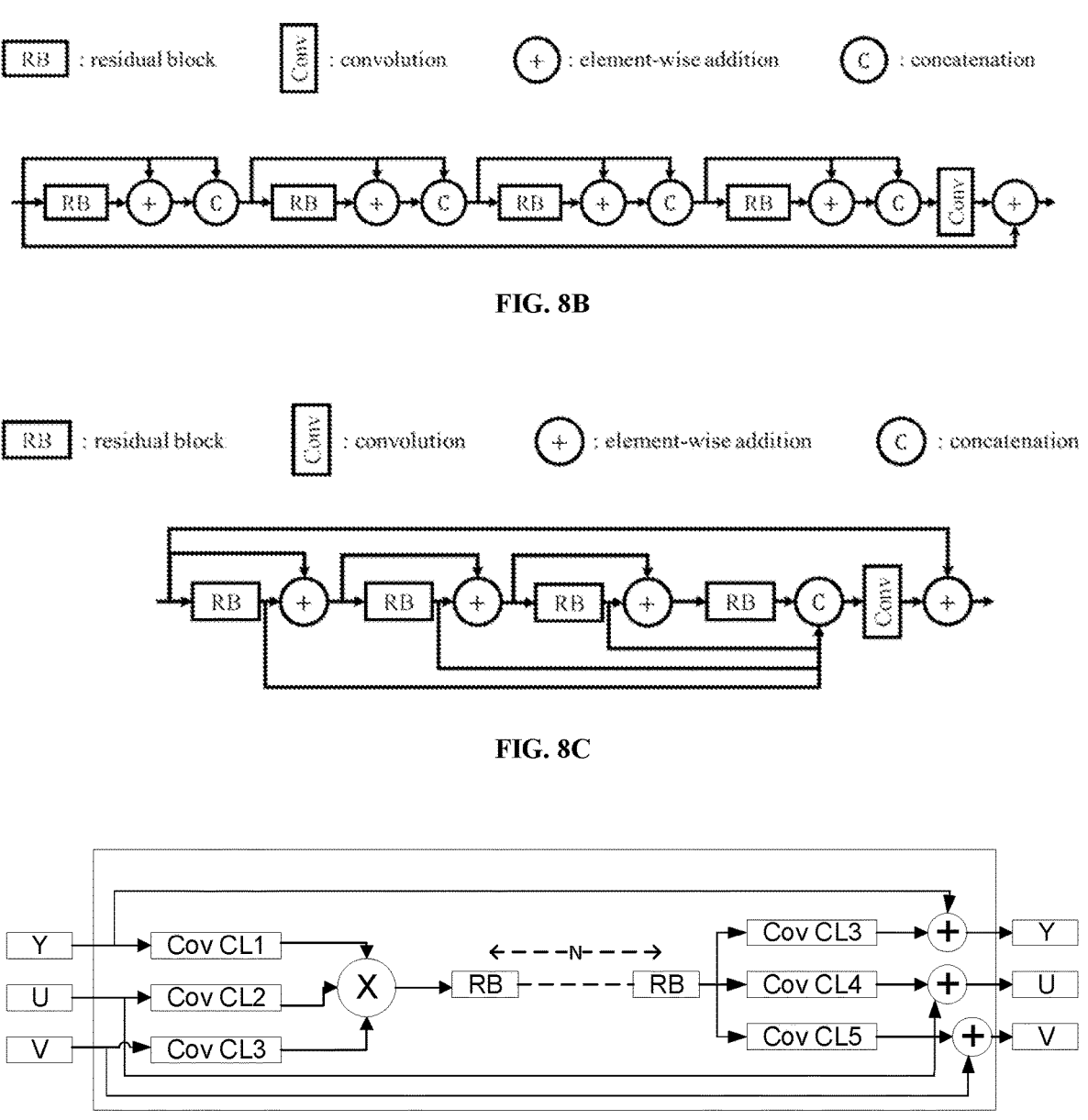
FIG. 8B illustrates another example of ResNet stacks multiple residual blocks in order to further improve the video coding efficiency in accordance with some implementations in the present disclosure.
FIG. 8C illustrates another example of ResNet tackling single-image super-resolution (SISR) by aggregating the output of residual blocks in accordance with some implementations in the present disclosure.
FIG. 9 illustrates a typical neural network-based model to perform image filtering for video coding in accordance with some implementations in the present disclosure.

In FIGS. 8A-8B, several variations of ResNet were proposed to improve the recovered image quality for single image super-resolution (SISR) and increase the accuracy for image classification. FIG. 8A illustrates an example of ResNet including a plurality of residual blocks with global identity connection in accordance with some implementations in the present disclosure. In FIG. 8A, a variation of ResNet is proposed to enhance the visual quality of the up-sampled images. Specifically, a global identity connection is applied from the input of first residual block to the output of last residual block in order to facilitate the convergence of training procedure.

FIG. 8B illustrates another example of ResNet stacks multiple residual blocks in order to further improve the video coding efficiency in accordance with some implementations in the present disclosure. Each residual block directly propagates its own input to the following unit by concatenation operation. In other words, each intermediate block can receive multi-hierarchical information from its preceding units because multi-level information can flow through the identical connection. The parameter of each residual block in FIG. 8B is linearly increased with the number of layers because the concatenation operation.

In FIGS. 8A-8B, before the residual information can be propagated to later module, the residual features have to go through one or several modules. Due to identity connection, these residual features can be rapidly coupled with identity features at certain layer and stop propagating to succeeding module. Therefore, the residual features in previous two variations are limited locally and results in performance degradation.

FIG. 8C illustrates another example of ResNet tackling single-image super-resolution (SISR) by aggregating the output of residual blocks in accordance with some implementations in the present disclosure. In FIG. 8C, the output of the last residual block is concatenated with all the output of previous three modules. Before applied with element-wise addition with the input of first residual block, the concatenated hierarchical features are fused by convolutional operation. Different from the first two variations, aggregated ResNet make non-local features applicable to the last residual block so that the hierarchical information can be propagated to succeeding blocks, achieving the feature representation in a more discriminative way.

In the present disclosure, methods and apparatus related to neural network based image filtering are proposed to further improve the coding efficiency of current hybrid video coding. The proposed methods and apparatus may be applied as part of the in-loop filtering, e.g., between the deblocking filter and sample adaptive offset (SAO) as shown in FIG. 2 or as post-loop filtering to improve the current video coding techniques, or as post-processing filtering after the current video coding techniques.

FIG. 9 illustrates a typical neural network based model to perform image filtering for video coding in accordance with some implementations in the present disclosure. The YUV components may be provided to the neural network model in parallel. This paralleled input of YUV components may be beneficial not only for reducing processing delay but also for the neural network model to learn the correlations among collocated YUV information, e.g., cross-components filtering and/or luma guided chroma filtering. The on/off control of this neural network model-based filter may be performed at coding tree unit (CTU) level for reasonable trade-off between control granularity and signaling overhead. The on/off control of the neural network-based filters for YUV components may be performed at same or different granularity. For example, the on/off control of this neural network model-based filter for Y component may be performed at CTU level while the on/off control for U and V components may be performed at frame level, e.g., to save CTU level flag signaling overhead.

Feature Map Resolution Alignment

When the CTU level YUV information is provided to the neural network model filter as shown in FIG. 9, the resolutions of the YUV CTU patches may or may not be the same. For example, if the encoded video content is YUV420, the resolutions of the three collocated YUV patches may not be the same. In this case, resolution alignment is needed. For easier illustration purpose, all the proposed methods and devices in this disclosure are assuming the video content is YUV420. For different content format, e.g., YUV422, YUV444, the proposed methods may be easily extended.

In some examples, the resolution alignment may be performed before the YUV patches enter the neural network.

In some examples, one 128×128 Y patch may be down-sampled into one 64×64 patch or four 64×64 patches. When four 64×64 patches are generated, all the information of the original 128×128 patch may be kept and distributed in the four patches. The method used for the information distribution of the original 128×128 patch may be partition based, e.g., one 64×64 patch may be from the top-left of the original 128×128 patch, and another 64×64 patch may be from the top-right of the original 128×128 patch. Alternatively, the method used for the information distribution of the original 128×128 patch may be interleave based, e.g., every four adjacent samples of the original 128×128 patch are evenly distributed in the four 64×64 patches.

In some examples, one 64×64 U or V patch may be up-sampled into one 128×128 patch.

In some examples, the resolution alignment may be performed after the YUV patches enter the neural network. In one example, the Y input resolution may be decreased to match the UV input. One way to achieve this is to use convolution layers with doubled stride size compared to UV input. In this example, at the end of the neural network, a resolution increase layer is needed to scale up the Y content such that the output of the model has the same resolution as the input. One way to achieve this is to use pixel shuffle layer to scale up the Y resolution. In another example, the UV input resolution may be increased to match the Y input. One way to achieve is to use pixel shuffle layer to scale up UV at the beginning of the neural network, and then scale down at the end of the neural network.

Feature Map Resolution Control

Feature map resolution proportionally affects the neural network processing overhead, but may not be proportionally affect the performance of the neural network. In order to control the computation complexity of the model filtering, different solutions may be available, e.g., number of residual blocks, number of input and output channels of the convolution layers at each residual block. Resolution control of the feature map in a convolution layer is another effective option to control the computation complexity.

Figure 10:
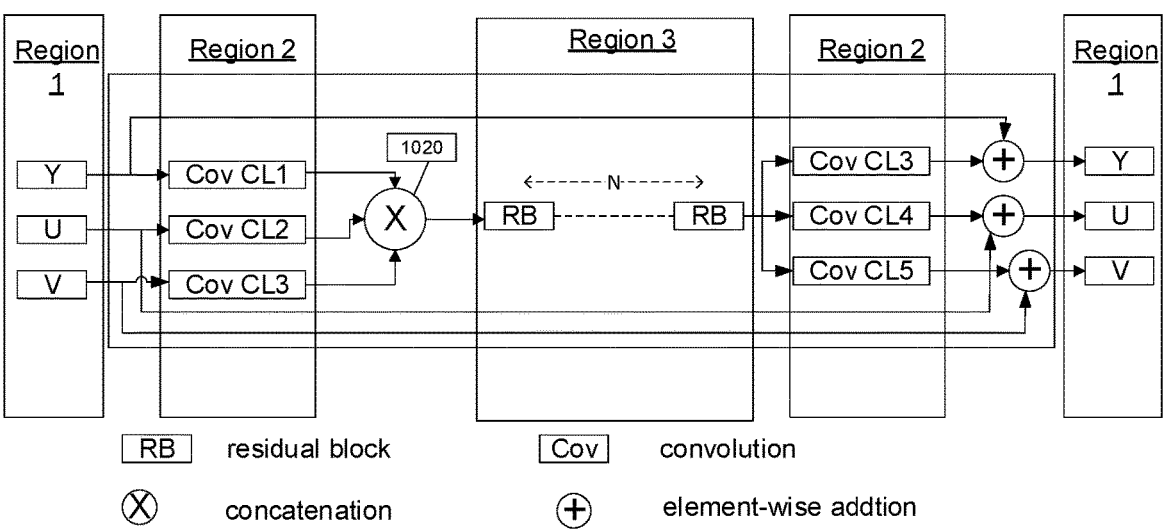
FIG. 10 illustrates region-based feature map resolution control in accordance with some implementations in the present disclosure.

FIG. 10 illustrates region-based feature map resolution control in accordance with some implementations in the present disclosure. As shown in FIG. 10, three regions may be used to adjust feature map resolution for computation complexity control (which can be termed as region-based feature map resolution control). In the region 1, resolution of the input YUV patches are determined and corresponding scale up/down operations are performed. For example, the up/down sampling methods introduced in "Feature map resolution alignment." An example is shown in FIG. 15.

Figure 15:
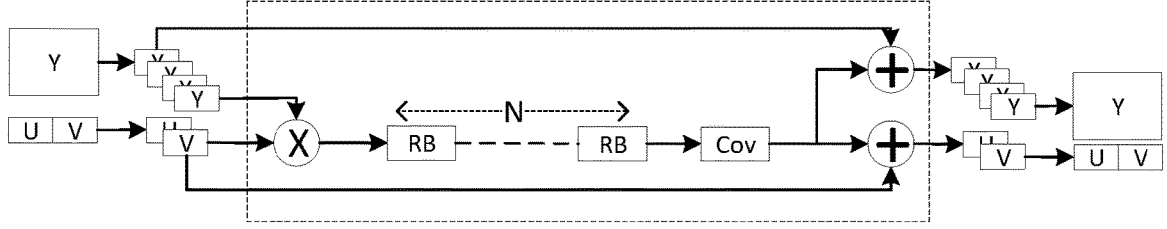
FIG. 15 illustrates Luma down-sampling in region 1 of a neural network in accordance with some implementations of the present disclosure.

FIG. 15 illustrates Luma down-sampling in region 1 of a neural network in accordance with some implementations of the present disclosure. As shown in FIG. 15, the original Y patch is down-sampled into four down-sampled Y patches in region 1 before entering the neural network. For example, one 128×128 Y patch may be down-sampled into four 64×64 Y patches. The inverse operation, e.g., up-sample, is performed in region 1 after the processing of the neural network finishes. As shown in FIG. 15, the four down-sampled Y patches outputted by the neural network are up-sampled into one original Y patch. For example, the four 64×64 Y patches may be up-sampled into one 128×128 Y patch.

In region 2, resolution of the input YUV patches are determined and corresponding scale up/down operations are performed before YUV concatenation. As this region is located at the beginning of the neural network, if scale down operations are performed, input information may be lost significantly and overall performance after model training may be compromised. Two examples are respectively shown in FIGS. 13-14.

Figure 13:
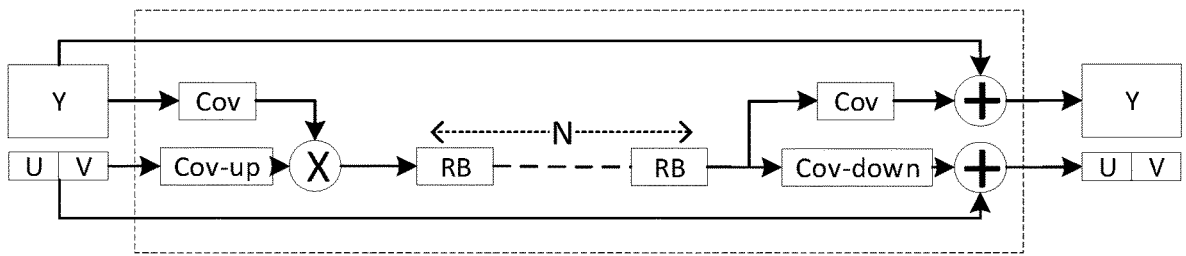
FIG. 13 illustrates Chroma up-sampling in region 2 of a neural network in accordance with some implementations of the present disclosure.

FIG. 13 illustrates Chroma up-sampling in region 2 of a neural network in accordance with some implementations of the present disclosure. As shown in FIG. 13, the UV patches, after entering the neural network, are scaled up by a corresponding convolution block or layer in region 2 of the neural network. An inverse operation, e.g., scaling-down, is performed on the corresponding UV patches outputted by the last residual block in region 3, as shown in FIG. 13.

Figure 14:
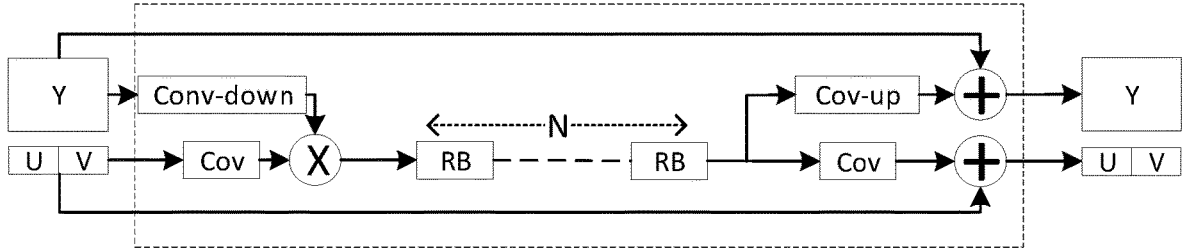
FIG. 14 illustrates Luma down-sampling in region 2 of a neural network in accordance with some implementations of the present disclosure.

FIG. 14 illustrates Luma down-sampling in region 2 of a neural network in accordance with some implementations of the present disclosure. As shown in FIG. 14, the Y patch, after entering the neural network, is scaled down by a corresponding convolution block or layer in region 2 of the neural network. An inverse operation, e.g., scaling-up, is performed on the corresponding Y patch outputted by the last residual block in region 3, as shown in FIG. 14.

In the region 3, resolution of the input YUV patches may be scaled up/down at one of the earlier residual blocks, and inverse operations, e.g., scale down/up, may be performed at later residual blocks. As this region is located after YUV concatenation, if scale down operation is performed, input information may be less significantly lost than region 2 since most input information are already captured or learned in earlier convolution layers which have enough depth for information learning. For example, after region 2, three channels of YUV content which has UV scaled up to 128×128 are generated. Y input information may be already learned/extracted and distributed/duplicated in earlier convolutional layers before the concatenation. Alternatively, a scale down operation may be performed after the first residual block because the first residual block may have enough channels to learn/extract Y input information features.

QP Independent Neural Network Model

In order to facilitate easier deployment of the proposed neural network model filtering, it is desired to remove input quantization parameter (QP) dependency from the neural network model. Thus, a single neural network model may be used for image filtering regardless of the input QP used for the video coding.

Figure 11:
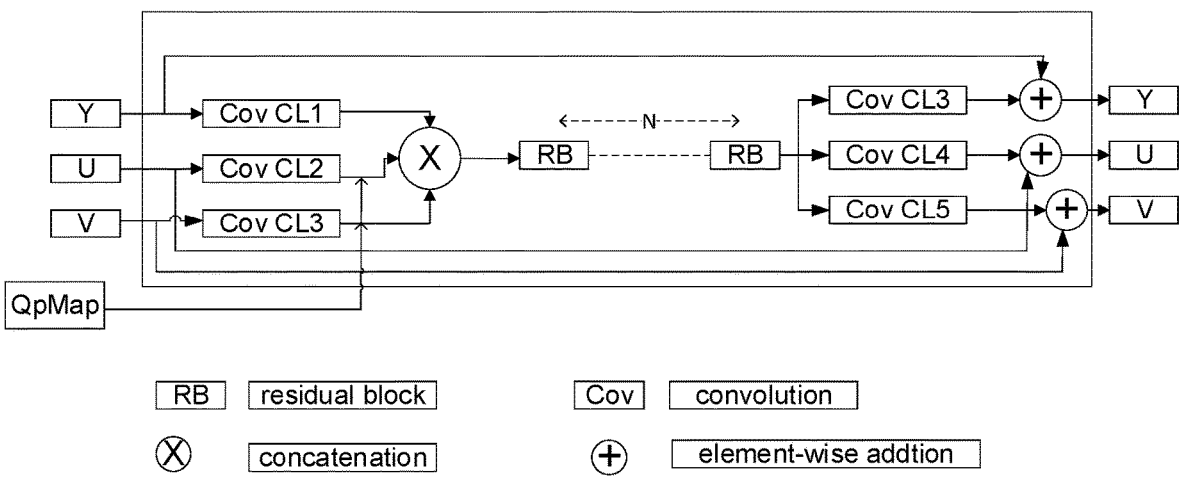
FIG. 11 illustrates a typical QP-independent neural network model in accordance with some implementations of the present disclosure.

FIG. 11 illustrates a typical QP-independent neural network model in accordance with some implementations of the present disclosure. For a typical video coding system, a QP value is used to calculate quantization step size for prediction residual quantization/de-quantization. Therefore, a different QP value represents a different level of video quality. In order to handle different video frames with different input QP and quality, a QpMap is provided to the neural network. The QpMap adds another dimension of information for neural network to learn and adaptively filter the provided YUV input which may include different levels of video quality (e.g., input Qp). In some common video coding standards such as HEVC, VVC or AVS, a predefined relationship (e.g., $Q_{step}=2^{(QP-4)/6}$) is typically used when an input Qp value is converted into a Qp step size for prediction residual quantization. For easier illustration, a QpMap containing or including either input Qp values or Qp step size values is used to introduce the proposed ideas as below.

Dynamic Range Control of QpMap Values

FIG. 11 illustrates a typical QP-independent neural network based model to perform image filtering for video coding in accordance with some implementations of the present disclosure. The QpMap are concatenated with YUV input channels. Each QpMap channel may contain the same value at different coordinates. And each QpMap channel may have the same resolution as the associated input channel. This is to say, QpMap channel for Y input has the same resolution as the Y input channel and each value of the QpMap indicates that all the samples within the Y input channel has the same Qp values.

Input QP value of each video frame/image may be directly used to generate QpMap value. Alternatively, input QP value of each video frame/image may be converted into Qp step size first, e.g., $Q_{step}=2^{(QP-4)/6}$, to generate QpMap value.

When QpMap values are generated from input QP or Qp step size, the QpMap value dynamic range is desired to be reasonable in following three senses.

First, the range should be large enough, so that different QpMap value can be easily used to represent/differentiate different input Qp or Qp step size. In other words, given two input Qp value, the corresponding QpMap values should not be close to each other.

Second, the range should be balanced enough, so that different QpMap value can evenly distributed at different positions of the range.

Third, the range should match the dynamic range of the associated YUV sample values. For example, if YUV sample values are normalized to [0, 1] by dividing the $P_{max}$, where $P_{max}=2^{bitdepth}-1$, the QpMap value is supposed to be normalized in a similar range as well.

Therefore, when QpMap is mapped to a dynamic range, it is proposed to not use the maximum or minimum input Qp or Qp step size as the dividing factor, otherwise the division will push the generated QpMap value towards one side of the dynamic range, which is equal to reduce the dynamic range of the QpMap value.

For example, if using maximal QpStep size 912 (corresponding to maximal input Qp 63), the theoretic dynamic range is (0, 1), but if input Qp step size is typically less than 45 (corresponding to input Qp 37), the effective dynamic range is only (0, 0.05), which means that in most cases QpMap value is close to 0.

Instead, it is proposed to use middle/median input Qp or Qp step size to do the normalization, so that the generated QpMap value may be distributed at either side of the dynamic range. e.g. [0.5, 1.5]. One exemplary selected middle/median input Qp value is Qp 32, and then converted into Qp step size is approximately 25.5, according to a QP-to-Qstep (Qp step size) equation (e.g., $Q_{step}=2^{(QP-4)/6}$). Thus, any input Qp value is first converted to a corresponding Qp step size and then followed by a division by the selected Qp Step size 25.5.

This selected input Qp or Qp step size for normalization division may be flexibly determined based on the actual input Qp range. For example, given an actual Qp range [22, 42], Qp 37 or its corresponding Qp step size may be selected as the dividing factor such that the normalized value of lower Qps in the actual Qp range are not too close to zero while the normalized value of higher Qps are not too much over 1.0. Alternatively, the maximum value of the actual input QP range (e.g., 42 of the actual Qp range [22, 42]) or its corresponding Qp step size may be selected as the dividing factor if the maximum value is not too big (e.g., within twice size) than the minimum value.

Prediction Based Adjustment of QpMap Values

As explained above, the QpMap values may be directly generated by the input Qp value, or may be generated by the Qp step size value according to the mapping relationship between input Qp value and Qp step size. For easier illustration purpose, the below description assumes that the QpMap values are directly generated by the input Qp value. When the QpMap values are generated by Qp step size values, the proposed ideas/methods may be similarly extended.

For inter-predicted video frames/images, most blocks/CTUs in the frame/image may be inter-predicted with small or no residuals, e.g., skip mode. In this case, the effective input Qp value should be determined by the corresponding reference frames/images.

In some examples, the input Qp value of the corresponding reference frame/image may be saved and obtained when the current image is reconstructed during motion compensation process. The input QP value of each current frame is known. But the input Qp value of this frame becomes unknown when this frame is not current and this frame is a reference frame for another frame. Thus, Qp values have to be saved in order to obtain it in the future.

In some examples, the input Qp value of the corresponding reference frame/image may be derived by subtracting a specific value from the QP value of the current frame which is inter-coded, where the specific value may be obtained by checking the temporal layer index of the current frame which is inter-coded.

In some other examples, if the reference frame/image is a chain of reference images (the reference frame/image of a reference frame/image), this information may be inherited or carried over from signaling.

In a simple solution, for an inter-predicted video frame/image, the effective Qp step size may be derived by a constant scaling factor such as 0.5 from the Qp step size of the current frame, which corresponds to an input Qp difference with value 6. This scaling operation is an approximation to the reference frame/image input Qp or Qp step size.

Due to the typical mapping relationship between Qp Step size and input Qp (e.g., $Q_{step}=2^{(QP-4)/6}$), the scaling operation of Qp step size is equivalent to the subtraction/addition operation of the input Qp value. That is, the scaling operation of Qp step size can be implemented by applying a subtraction/addition operation of the input Qp value.

Depends on the trade-off between signaling overhead and prediction-based adjustment accuracy, the scaling of Qp step size or the subtraction/addition of the input Qp value may be represented in a different precision or/and at different granularity. For easier illustration, the below proposed ideas/methods assume that the scaling of QpStep size is used for prediction-based adjustment of QpMap values. When the subtraction/addition of the input Qp value is used for prediction-based adjustment of QpMap values, the proposed ideas/methods may be extended straightforwardly.

In one or more examples, the scaling of Qp Step size may be applied to an intra-predicted frame/image as well, to compensate the inaccuracy of the constant scaling factor used for subsequent inter-predicted frames.

In another example, the Qp scaling factor may be flexibly derived using following different methods.

In the first method, the Qp scaling factor may be selected by the encoder from a set of values. The scaling factor set may be sequence based or image/slice based, which means the set may be coded in the picture header or sequence parameter set. The index of the selected Qp scaling factor in the scaling factor set may be selected based on rate-distortion optimization algorithms at the encoder side with different granularities, e.g., picture level index selection, CTU level index selection, block level selection (e.g., a picture may be portioned into different blocks based on quad-tree division), for the purpose of good trade-off between image quality and signaling overhead.

In the second method, the Qp scaling factor may be converted to a Qp offset/adjustment. The Qp offset/adjustment may be applied to the input Qp or Qp step size before calculating the QpMap values.

In one example, an adjusted input Qp value may be represented as $$Q_{p\_new}=Q_{p\_old}-Q_{p\_offset\_stepsize}\times(\text{lower\_bound}-\text{offset\_index})$$

where $Q_{p\_old}$ is the original Qp value for the current slice or CTU, $Q_{p\_new}$ is the new Qp value after adjustment, $Q_{p\_offset\_stepsize}$ is the step size for each Qp adjustment, lower_bound is an integer value which determines the maximum Qp reduction, and offset_index is a signaled index value (e.g., a value in range [0, 3]). The offset_index is decided at the encoder side and parsed/used at the decoder side. Note that Qp_offset_stepsize and lower_bound predefined constant value, or signaled as well.

For example, Qp_offset_stepsize may be a constant value such as 4, lower_bound is 2, when signaled offset_index is 1, the decoder may adjust the current Qp value 32 to be 28, where 28=32−4*(2−1).

In the third method, for current CTU/picture/block, the Qp scaling factor may be inherited from adjacent CTUs/picture/blocks (e.g., left or above CTUs/blocks in spatial domain, or the reference blocks/CTUs in time domain) to save signaling overhead.

In the fourth method, instead of signaling or inheritance, the Qp scaling factor may be calculated at the decoder side by the Qp difference of the current CTU/block and reference CTU/block. If there are multiple reference CTUs/blocks corresponding to the current CTU/block, an averaged value of the Qp scaling factor may be calculated. If a reference CTU/block is involved in a reference chain. The reference depth may be constrained and the Qp scaling factor may be calculated according to the parent reference CTU/block at most of the constrained reference depth.

In the fifth method, the Qp scaling factor of different components may be jointly signaled/selected/calculated for lower complexity. Alternatively, the Qp scaling factor of different components may be separately signaled/selected/calculated. Alternatively, the Qp scaling factor of luma and chroma may be separately signaled/selected/calculated.

In the sixth method, any combination of the above methods may be used as a hybrid method.

QpMap Value Based Sample Value Scaling

A QP-independent neural network model may not explicitly contain QpMap channels in the network. For example, as shown in FIG. 11, the QpMap value generated for each YUV channel is concatenated with YUV channels. Alternatively, the QpMap value fed into the network may be used to directly scale the sample values in each YUV channel. In this way, QpMap channels are not concatenated with YUV channels, which represents an implicit use of QpMap in the network.

When QpMap channels are input to the network and concatenated with YUV channels, similar as shown in FIG. 11, sample value scaling, i.e., scaling of the sample values at YUV channels, may be directly performed by element-wise multiplication. For example, each element of the QpMap channel for Y component is multiplied with corresponding element of the Y channel, and each element of the QpMap channel for U or V component is multiplied with corresponding element of the U or V channel. Note that the resolution of QpMap channel may be already aligned with the resolution of the corresponding component channel.

Figure 17:
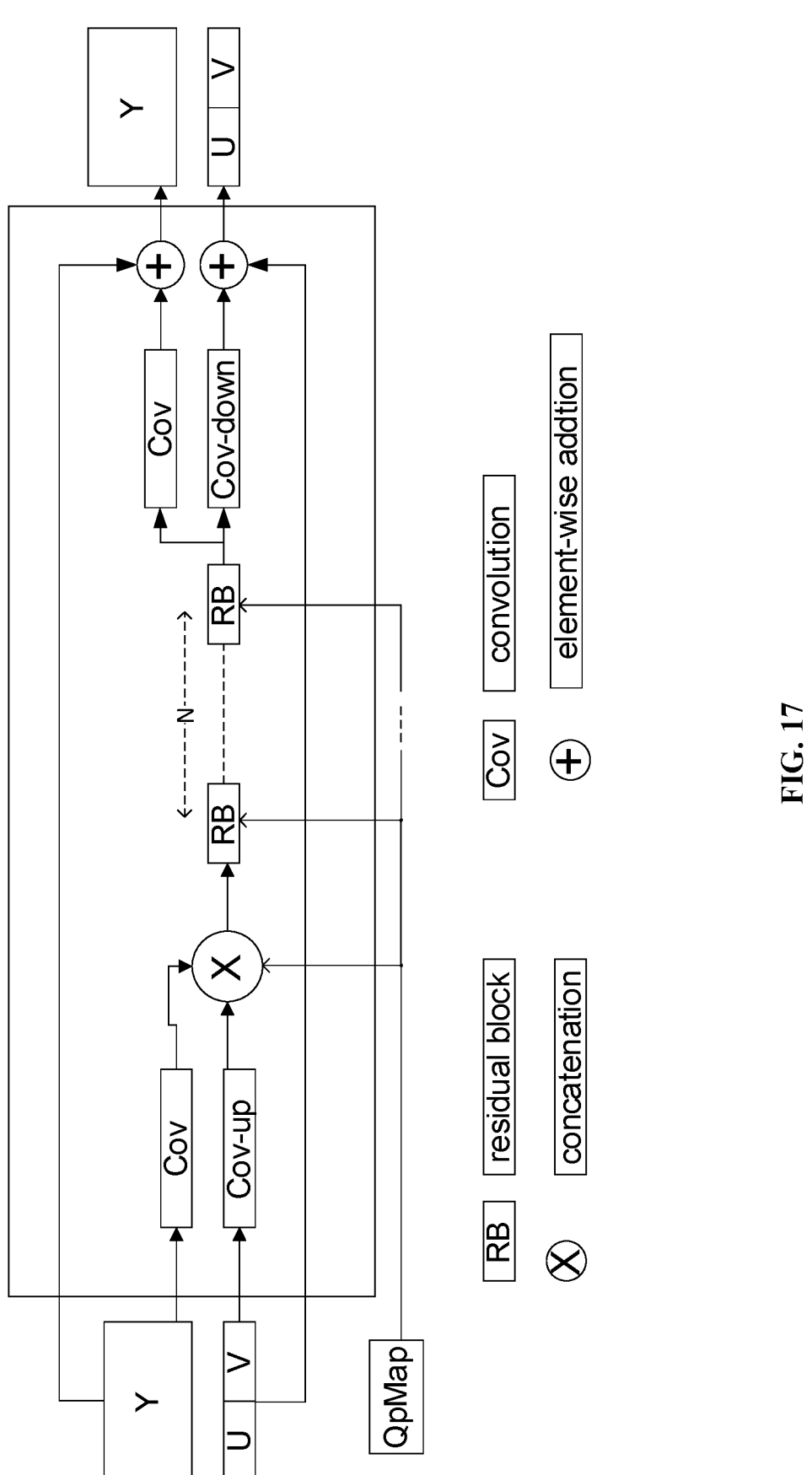
FIG. 17 illustrates an example of element-wise scaling performed at each residual block in accordance with some implementations of the present disclosure.

In another example, the element-wise scaling may also be performed at each residual block. FIG. 17 illustrates an example of element-wise scaling performed at each residual block in accordance with some implementations of the present disclosure. In FIG. 17, the QpMap channel is firstly concatenated with YUV channels after YUV resolution is aligned. Then the QpMap channels are not only used as input feature maps for the first residual block, but also used as sample value scaling factor at each residual block.

When the sample scaling is performed at each residual block, the scaling operation may be performed at the beginning of the residual block (e.g., the input of the residual block as in FIG. 7A), or performed at the end of the residual block (e.g., the output of the residual block as in FIG. 7A).

When the sample scaling is performed at each residual block, the QpMap information are equivalent to be reinforced multiple times in the network.

Note that, the above two sample scaling mechanisms may be exclusively used or combined. In other words, the sample scaling directly applied on YUV samples before concatenation such as FIG. 11, and the sample scaling applied at each residual block such as FIG. 17, may be both used in the same neural network or separately used in different neural networks.

In some examples of the implicit use of QpMap, the QpMap data may not be fed into the network, the scaling of sample values in each YUV channel is performed before the neural network.

Interactions Between Neural Network Based Model Filtering and Other In-Loop Filters When QpMap channels are provided to a neural network to filter video content with different qualities, the QpMap channels may include Qp information from one or more components.

Figure 12A:
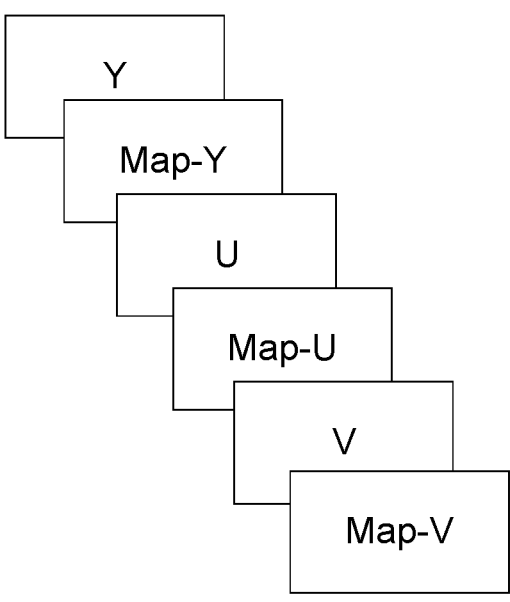
FIG. 12A illustrates an example of layout of collocated QpMap channels and YUV channels in accordance with some implementations of the present disclosure.
Figure 12B:
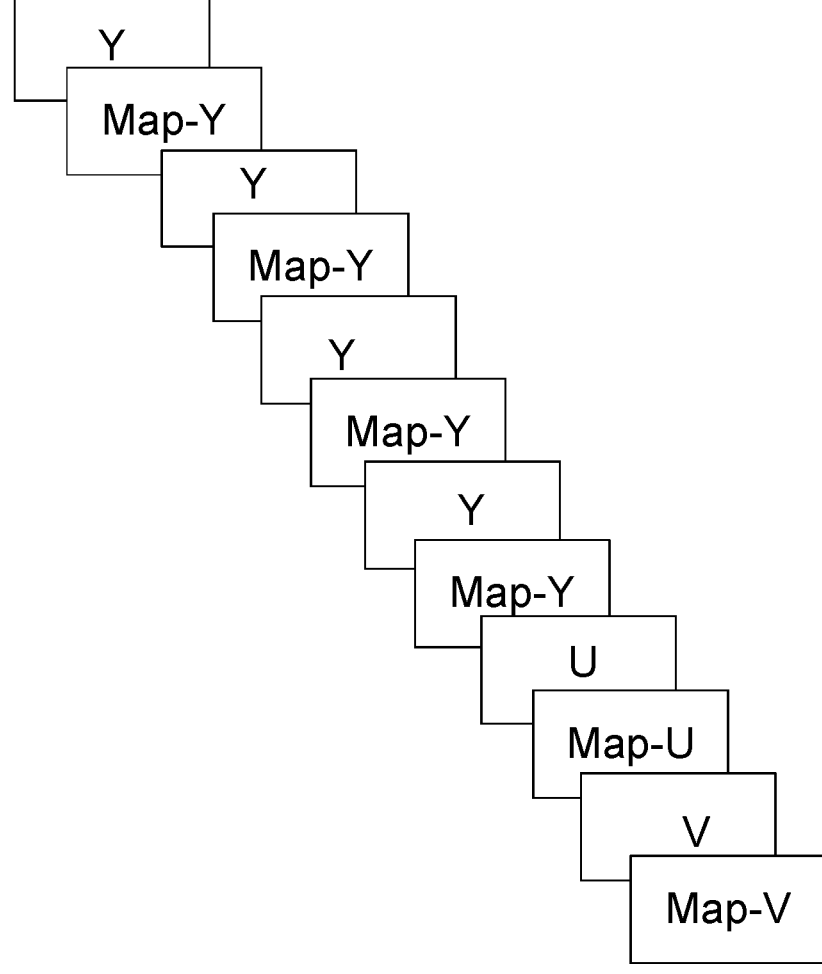
FIG. 12B illustrates an example of layout of collocated QpMap channels and YUV channels in accordance with some implementations of the present disclosure.

FIG. 12A illustrate an example of layout of collocated QpMap channels and YUV channels in accordance with some implementations of the present disclosure. FIG. 12B illustrate another example of layout of collocated QpMap channels and YUV channels in accordance with some implementations of the present disclosure. In FIGS. 12A-12B, block Map-Y indicates QpMap channel for Y channel, block Map-U indicates QpMap channel for U channel, and block Map-V indicates QpMap channel for V channel. Blocks Y, U, and V respectively indicate Y channel, U channel, and V channel.

Given a YUV420 content, the UV components may be up-sampled first and then YUV are collocated and interleaved with corresponding QpMap channels as shown in FIG. 12A, or the Y channel may be down-sampled into four smaller Y channels first and then YUV are collocated and interleaved with QpMap channels as shown in FIG. 12B. In some examples, either the up-sampling or down-sampling is performed within the network, e.g., regions 2 and 3 in FIG. 10 or outside of the network, e.g., region 1 in FIG. 10.

Figure 16A:
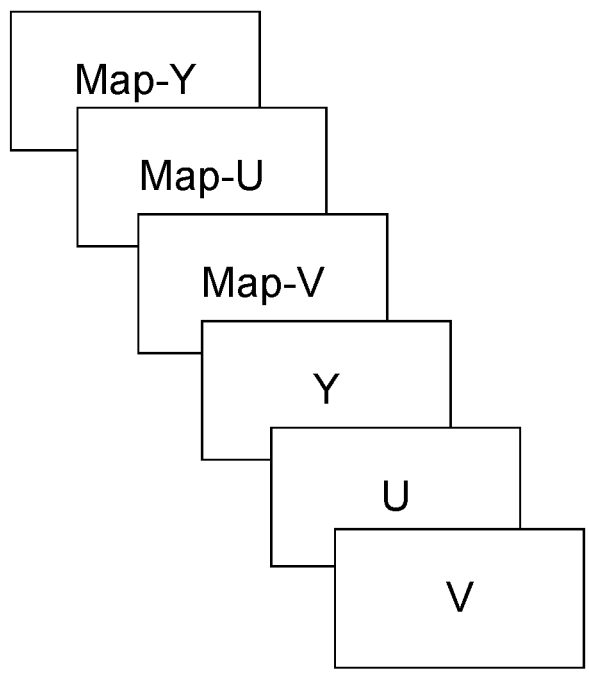
FIG. 16A illustrates another example of layout of collocated QpMap channels and YUV channels in accordance with some implementations of the present disclosure.
Figure 16B:
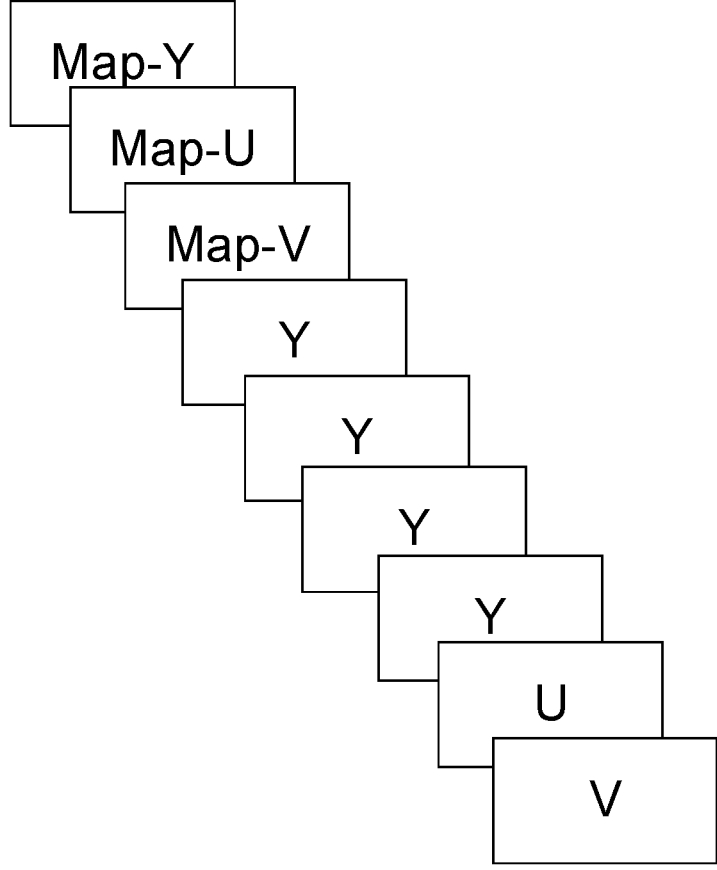
FIG. 16B illustrates another example of layout of collocated QpMap channels and YUV channels in accordance with some implementations of the present disclosure.

FIG. 16A illustrates another example of layout of collocated QpMap channels and YUV channels in accordance with some implementations of the present disclosure. FIG. 16B illustrates another example of layout of collocated QpMap channels and YUV channels in accordance with some implementations of the present disclosure. In FIGS. 16A-16B, block Map-Y indicates QpMap channel for Y channel, block Map-U indicates QpMap channel for U channel, and block Map-V indicates QpMap channel for V channel. Blocks Y, U, and V respectively indicate Y channel, U channel, and V channel. The multiple QpMap channels may be concatenated internally first then concatenated with YUV channels, as shown in FIGS. 16A-16B.

In case only one or more QpMap channels of one component is/are provided to a neural network, the one or more QpMap channels may be positioned on one side of the YUV channels, which indicates that the YUV channels are concatenated before the addition of QpMap channels so that YUV channels are adjacently collocated.

In another example, in addition of the QpMap channels from different components, additional QpMap channels for different types of training data may be needed. For example, if the training data is cropped from I frames or B frames or P frames, a QpMap containing frame type information may be generated and concatenated. The I frames are intra-coded frames, the B frames are bi-directional predicted frames, and the P frames are predicted frames.

Filtering Offset or Scaling of the Output of the Neural Network Model Based Filter For generalization purpose, a unified neural network model based filter may be used for different video content with different level of qualities, motion and illumination environment. The output of the neural network model based filter may be slightly adjusted in the form of offset or scaling at the encoder side for better coding efficiency.

The filtering offset or scaling value may be adaptively selected by the encoder from a set of values. The offset or scaling set may be sequence based or image/slice based, which means the set may be coded in the picture/slice header or sequence parameter set. The index of the selected offset or scaling value in the set may be selected based on rate-distortion optimization algorithms at the encoder side with different granularities, e.g., picture level index selection, CTU level index selection, block level selection, e.g., a picture may be portioned into different blocks based on quad-tree division, for the purpose of good trade-off between image quality and signaling overhead.

The selection of the adaptive filtering offset or scaling value may be based on certain classification algorithms such as content smoothness or histogram of oriented gradients. The adaptive filtering offset or scaling value of each category is calculated and selected at the encoder and explicitly signaled to the decoder for reducing sample distortion effectively, while the classification of each sample is performed at both the encoder and the decoder for saving side information significantly.

The selection of the adaptive filtering offset or scaling value may be jointly or separately performed for different components, e.g., YUV have different adaptive filtering offset or scaling values.

Training Data Generation and Training Process

When a neural network based filter model is trained, the training data preparation and training process may be performed in different ways.

In some examples, the model may be trained based on a data set with only still images. The data set may be encoded with all I frames from the video coding tool where the neural network based filter is used.

In some examples, the model may be trained based on a two-path process. In the first path, a data set may be encoded with all I frames and a model A may be trained based on all the I frames. In the second path, the same data set or a new data set may be encoded with a combination of I, B and P frames with different ratios (the number ratio of the contained I, B and P frames). In some examples, the generated I/B/P frames are encoded by applying the model A trained in the first path. Based on the newly generated I/B/P frames, a new model B may be trained.

When model B is trained, model A may be loaded as a pre-trained model such that model B is a refined model staring from model A. In another example, another model different from model A may be loaded as a pre-trained point.

Alternatively, model B may be trained from scratch.

In some examples, the model may be trained multi-path that is more than two-path. In the first path, a model A may be trained based on I frames. In the second path, a model B may be trained or refined based on model A based on a combination of I/B/P frames when model A is applied to the encoder. Note that the selected combination of the B/P frames during this second training path may be only from low temporal layers. In the third path or further paths, a model C may be trained or refined based on model B based on higher temporal layers of B/P frames. When higher temporal layers of B/P frames are generated and selected, model B or/and model A may be applied at the encoder side.

Before network training, training data must be generated. In this multi-path method, training data is generated by three paths including: the first pass is to generate I frames only, which is used to train model A; once model A is ready, the encoder may or may not load model A and generate low temporal layer B/P frames, which is called the second path. These generated low temporal layer B/P frames are used to train model B by a new training or being refined based on model A.

Further, once model B is ready, the encoder may or may not load model A and B and generate high temporal layer B/P frames, which is called the third path. These generated high temporal layer B/P frames are used to train model C by a new training or being refined based on model A or/and B. Interactions Between Neural Network Based Model Filtering and Other In-Loop Filters When neural network based model filtering is signaled to be turned on at CTU level or frame level, the deblocking filtering may be skipped to avoid unnecessary computation or over-smoothing. Alternatively, the deblocking filtering may be still performed for visual quality purpose.

When neural network-based model filtering is signaled to be turned on at CTU level or frame level, some other in-loop filters such ALF, Cross Component Adaptive Loop Filter (CCALF) and SAO may be turned off.

When neural network based model filtering is signaled to be turned on at CTU level or frame level, other in-loop filters may be selectively turned on or off at CTU level or frame level. For example, if an intra-frame or an intra-frame CTU is enabled for neural network-based model filtering, other in-loop filters such as deblocking filtering, or/and ALF, or/and CCALF, or/and SAO, for current intra-frame, or current intra-frame CTU are disabled.
Deblocking Filter Assisted Neural Network Based Model Filtering The main purpose of the deblocking filter is to remove blocking artifacts. In a typical situation, the samples that are filtered/refined by the deblocking filter are most likely located at the partition or prediction block boundaries. If compare the sample values changes before and after deblocking filter, a deblocking strength map may be generated, where the sample values that are not changed have strength values to be zero, and the sample values that are changed have non-zero strength values. Each non-zero value is determined by the deblocking strength and also the dynamic range defined for the strength map.

When this deblocking strength map is generated and input to the neural network, the prediction information and the partition information of each image is equivalent to be included. In other words, when this deblocking strength map is inputted into the neural network, there is no need to input the prediction information or the partition information of each image to the neural network as an input of the neural network. This is because only the samples located on the prediction block boundary or/and partition block boundary may have non-zero values on the corresponding coordinate on the deblocking strength map.

Figure 18:
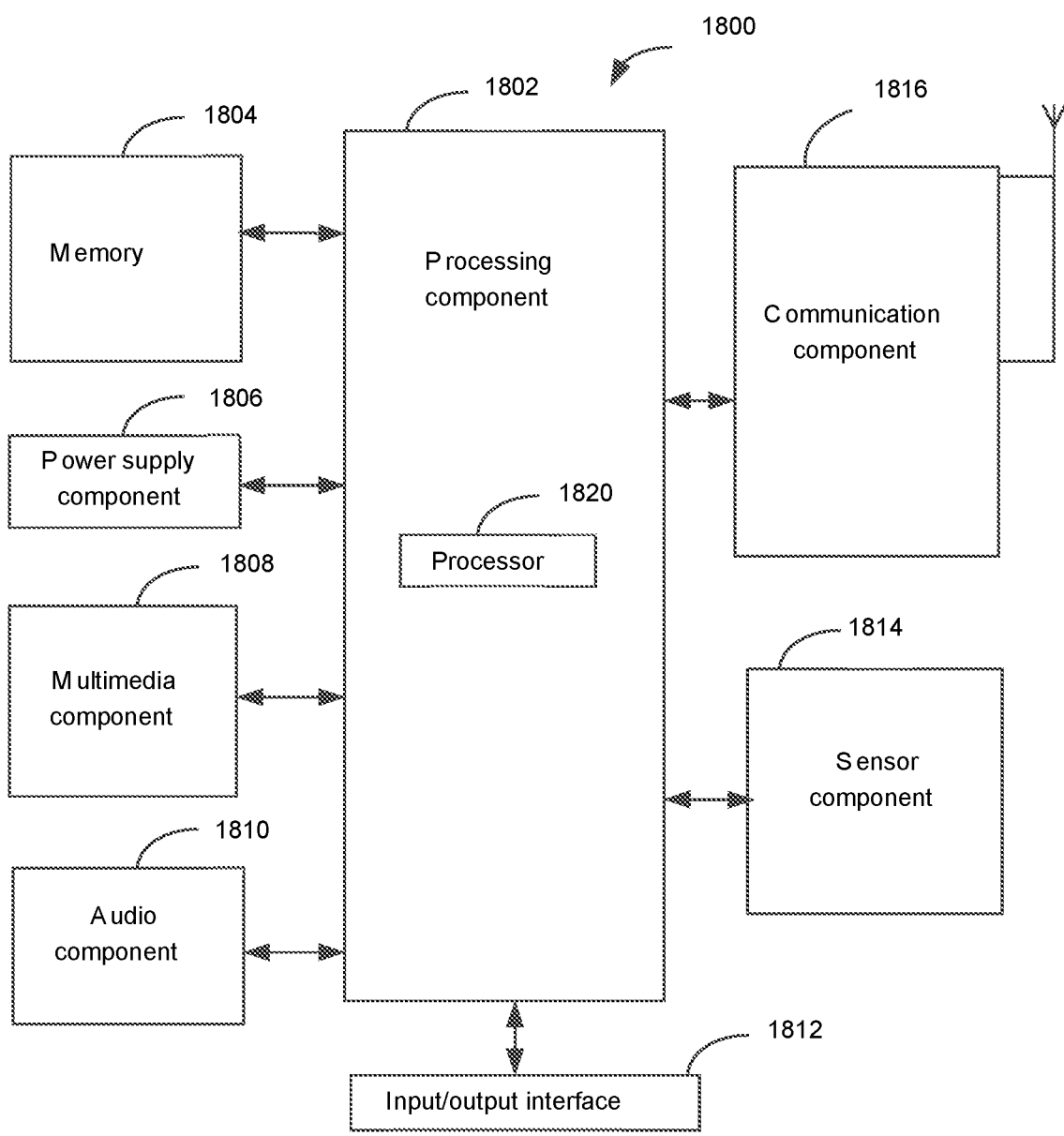
FIG. 18 is a block diagram illustrating an apparatus for image filtering in video coding using a neural network in accordance with some implementations of the present disclosure.

FIG. 18 is a block diagram illustrating an apparatus for image filtering in video coding using a neural network in accordance with some implementations of the present disclosure. The apparatus 1800 may be a terminal, such as a mobile phone, a tablet computer, a digital broadcast terminal, a tablet device, or a personal digital assistant.

As shown in FIG. 18, the apparatus 1800 may include one or more of the following components: a processing component 1802, a memory 1804, a power supply component 1806, a multimedia component 1808, an audio component 1810, an input/output (I/O) interface 1812, a sensor component 1814, and a communication component 1816.

The processing component 1802 usually controls overall operations of the apparatus 1800, such as operations relating to display, a telephone call, data communication, a camera operation, and a recording operation. The processing component 1802 may include one or more processors 1820 for executing instructions to complete all or a part of steps of the above method. Further, the processing component 1802 may include one or more modules to facilitate interaction between the processing component 1802 and other components. For example, the processing component 1802 may include a multimedia module to facilitate the interaction between the multimedia component 1808 and the processing component 1802.

The memory 1804 is configured to store different types of data to support operations of the apparatus 1800. Examples of such data include instructions, contact data, phonebook data, messages, pictures, videos, and so on for any application or method that operates on the apparatus 1800. The memory 1804 may be implemented by any type of volatile or non-volatile storage devices or a combination thereof, and the memory 1804 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1806 supplies power for different components of the apparatus 1800. The power supply component 1806 may include a power supply management system, one or more power supplies, and other components associated with generating, managing and distributing power for the apparatus 1800.

The multimedia component 1808 includes a screen providing an output interface between the apparatus 1800 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1808 may include a front camera and/or a rear camera. When the apparatus 1800 is in an operation mode, such as a shooting mode or a video mode, the front camera and/or the rear camera may receive external multimedia data.

The audio component 1810 is configured to output and/or input an audio signal. For example, the audio component 1810 includes a microphone (MIC). When the apparatus 1800 is in an operating mode, such as a call mode, a recording mode and a voice recognition mode, the microphone is configured to receive an external audio signal. The received audio signal may be further stored in the memory 1804 or sent via the communication component 1816. In some examples, the audio component 1810 further includes a speaker for outputting an audio signal.

The I/O interface 1812 provides an interface between the processing component 1802 and a peripheral interface module. The above peripheral interface module may be a keyboard, a click wheel, a button, or the like. These buttons may include but not limited to, a home button, a volume button, a start button, and a lock button.

The sensor component 1814 includes one or more sensors for providing a state assessment in different aspects for the apparatus 1800. For example, the sensor component 1814 may detect an on/off state of the apparatus 1800 and relative locations of components. For example, the components are a display and a keypad of the apparatus 1800. The sensor component 1814 may also detect a position change of the apparatus 1800 or a component of the apparatus 1800, presence or absence of a contact of a user on the apparatus 1800, an orientation or acceleration/deceleration of the apparatus 1800, and a temperature change of apparatus 1800. The sensor component 1814 may include a proximity sensor configured to detect presence of a nearby object without any physical touch. The sensor component 1814 may further include an optical sensor, such as a CMOS or CCD image sensor used in an imaging application. In some examples, the sensor component 1814 may further include an acceleration sensor, a gyroscope sensor, a magnetic sensor, a pressure sensor, or a temperature sensor.

The communication component 1816 is configured to facilitate wired or wireless communication between the apparatus 1800 and other devices. The apparatus 1800 may access a wireless network based on a communication standard, such as Wi-Fi, 4G, or a combination thereof. In an example, the communication component 1816 receives a broadcast signal or broadcast related information from an external broadcast management system via a broadcast channel. In an example, the communication component 1816 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 1800 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors, or other electronic elements to perform the above method. A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk, etc.

FIG. 19 is a flowchart illustrating a process for image filtering in video coding using a neural network in accordance with some implementations of the present disclosure.

In step 1901, the processor 1820 loads a plurality of QpMap values at one or more QpMap channels into the neural network. As shown in FIG. 11, the plurality of QpMap channels respectively combined with corresponding YUV channels after the three convolution blocks or layers before the concatenation block.

For example, QpMap may have three channels for YUV respectively: QP-Y, QP-U, QP-V because YUV may have different QP values.

In step 1902, the processor 1820 obtains a QP scaling factor by adjusting a plurality of input QP values related to an input frame.

In some examples, an encoder may obtain a scaled QP step size by performing a subtraction or an addition on a corresponding QP input value and obtain the QP scaling factor based on the scaled QP step size.

In step 1903, the processor 1820 adjusts, according to the QP scaling factor, the plurality of QpMap values for the neural network to learn and filter the input frame to the neural network.

In some examples, the processor 1820 may obtain a QP offset based on a QP offset step size, a lower bound, and an offset index, where the QP offset step size may be a step size for adjusting each input QP value, the lower bound may be an integer value determining a maximum QP value reduction, and the offset index may be a signaled index value. Further, the processor 1820 may subtract the QP offset from a QP input value.

In some examples, the encoder may signal the QP offset step size, the low bound, and the offset index, where the offset index may be an integer between 0 and 3, and the QP offset step size and the low bound may be respectively predefined constant values.

In some examples, the encoder may predefine the QP offset step size and the low bound. The encoder may further signal the offset index which may be an integer between 0 and 3. For examples, the QP offset step size and the low bound may be predefined as constant values. In this case, the QP offset step size and the low bound do not need to be signaled by the encoder. In response to determining that the QP offset step size and the low bound are not constant values, the encoder signal the QP offset step size and the low bound to the decoder.

In some examples, the processor 1820 may load a plurality of input patches associated with the input frame into the neural network at a plurality of input channels, such as YUV channels and scale the plurality of input patches using element-wise multiplication based on the plurality of QP map values that have been adjusted.

In some examples, the processor 1820 may align resolution of a plurality of input patches at the plurality of input channels such as the YUV channels; obtain a concatenated input by concatenating, by a concatenation block in the neural network, the plurality of input patches and the plurality of QP map values; load the concatenated input into a residual network following the concatenation block, where the residual network may include a plurality of residual blocks as shown in FIG. 17; and respectively load the plurality of QP map values as a sample value scaling factor input to one or more residual blocks in the residual network.

In some examples, the processor 1820 may scale an input to a residual block based on the sample value scaling factor before loading the input to the residual block. For example, the input of the residual block as in FIG. 7A.

In some examples, the processor 1820 may scale an output of a residual block based on the sample value scaling factor. For example, the output of the residual block in FIG. 7B.

In some examples, before obtaining the concatenated input, the processor 1820 may scale the plurality of input patches by element-wise multiplication based on the plurality of QP map values.

FIG. 20 is a flowchart illustrating a process for image filtering in video coding using a neural network in accordance with some implementations of the present disclosure.

In step 2001, the processor 1820 generates, by a deblocking filter, a deblocking strength map indicating prediction or partition block boundaries.

In some examples, the processor 1820 may generate the deblocking strength map by comparing sample value changes before and after the deblocking filter, where the deblocking strength map may include a plurality of strength values, a strength value equal to zero may indicate that a corresponding sample value is not changed, and a strength value equal to non-zero may indicate that a corresponding sample value is changed.

In some examples, the strength value equal to non-zero may be within a dynamic range defined for the deblocking strength map.

In step 2002, the processor 1820 inputs the deblocking strength map into a neural network to learn and filter an input frame to the neural network.

In some examples, the processor 1820 may input the deblocking strength map into the neural network to replace an input of a prediction map or a partition map related to the input frame.

In some examples, in response to determining a coding scenario of the input frame, the processor 1820 may determine whether or not to perform a deblocking filtering on the input frame before inputting the deblocking strength map into the neural network.

In some examples, the processor 1820 may perform the deblocking filtering on the input frame before inputting the deblocking strength map into the neural network.

In some examples, the processor 1820 may skip the deblocking filtering on the input frame before inputting the deblocking strength map into the neural network In some examples, the processor 1820 may skip the deblocking filtering on the input frame by recovering prediction sample values after the deblocking filtering.

In some other examples, there is provided a non-transitory computer readable storage medium 1804, having instructions stored therein. When the instructions are executed by one or more processors 1820, the instructions cause the processor to perform any method as described in FIGS. 19-20 and above.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for image filtering in video coding, comprising:
loading a plurality of quantization parameter (QP) map (QpMap) values at one or more QpMap channels into a neural network;
obtaining a QP scaling factor by adjusting a plurality of input QP values related to an input frame; and
adjusting, according to the QP scaling factor, the plurality of QpMap values for the neural network to learn and filter the input frame to the neural network;
wherein obtaining the QP scaling factor by adjusting the plurality of input QP values related to the input frame comprises:
obtaining a scaled QP step size by performing a subtraction or an addition on a corresponding QP input value, wherein the scaling operation of Qp step size is equivalent to the subtraction or addition operation of the corresponding QP input value; and
obtaining the QP scaling factor based on the scaled QP step size.

2. The method of claim 1, wherein adjusting the plurality of input QP values related to the input frame comprises:
obtaining a QP offset based on a QP offset step size, a lower bound, and an offset index, wherein the QP offset step size is a step size for adjusting each input QP value, the lower bound is an integer value determining a maximum QP value reduction, and the offset index is a signaled index value; and
subtracting the QP offset from a QP input value.

3. The method of claim 2, further comprising:
signalling, by an encoder, the QP offset step size, the low bound, and the offset index, wherein the offset index is an integer between 0 and 3.

4. The method of claim 2, further comprising:
predefining, by an encoder, the QP offset step size and the low bound; and
signalling, by the encoder, the offset index, wherein the offset index is an integer between 0 and 3.

5. The method of claim 1, further comprising:
loading a plurality of input patches associated with the input frame into the neural network at a plurality of input channels; and
scaling the plurality of input patches using element-wise multiplication based on the plurality of QP map values.

6. The method of claim 1, further comprising:
aligning resolution of a plurality of input patches at a plurality of input channels;
obtaining a concatenated input by concatenating, by a concatenation block in the neural network, the plurality of input patches and the plurality of QP map values;
loading the concatenated input into a residual network following the concatenation block, wherein the residual network comprises a plurality of residual blocks; and
respectively loading the plurality of QP map values as a sample value scaling factor input to one or more residual blocks in the residual network.

7. The method of claim 6, further comprising:
scaling an input to a residual block based on the sample value scaling factor before loading the input to the residual block.

8. The method of claim 6, further comprising:
scaling an output of a residual block based on the sample value scaling factor.

9. The method of claim 6, further comprising:

scaling the plurality of input patches by element-wise multiplication based on the plurality of QP map values.

10. An apparatus for image filtering in video coding using a neural network, comprising:

one or more processors; and a memory configured to store instructions executable by the one or more processors, wherein the one or more processors, upon execution of the instructions, are configured to:

load a plurality of quantization parameter (QP) map (QpMap) values at one or more QpMap channels into a neural network;

obtain a QP scaling factor by adjusting a plurality of input QP values related to an input frame; and adjust, according to the QP scaling factor, the plurality of QpMap values for the neural network to learn and filter the input frame to the neural network;

wherein the one or more processors are configured to obtain the QP scaling factor by adjusting the plurality of input QP values related to the input frame comprises that the one or more processors are configured to:

obtain a scaled QP step size by performing a subtraction or an addition on a corresponding QP input value, wherein the scaling operation of Qp step size is equivalent to the subtraction or addition operation of the corresponding QP input value; and obtain the QP scaling factor based on the scaled QP step size.

11. The apparatus of claim 10, wherein the one or more processors configured to adjust the plurality of input QP values related to the input frame comprises:

obtain a QP offset based on a QP offset step size, a lower bound, and an offset index, wherein the QP offset step size is a step size for adjusting each input QP value, the lower bound is an integer value determining a maximum QP value reduction, and the offset index is a signaled index value; and subtract the QP offset from a QP input value.

12. The apparatus of claim 11, the one or more processors further configured to:

signal the QP offset step size, the low bound, and the offset index, wherein the offset index is an integer between 0 and 3.

13. The apparatus of claim 11, the one or more processors further configured to:

predefine the QP offset step size and the low bound; and signal the offset index, wherein the offset index is an integer between 0 and 3.

14. A non-transitory computer readable storage medium storing a bitstream to be coded by a method for image filtering in video coding, wherein the method comprises:

loading a plurality of quantization parameter (QP) map (QpMap) values at one or more QpMap channels into a neural network;

obtaining a QP scaling factor by adjusting a plurality of input QP values related to an input frame; and adjusting, according to the QP scaling factor, the plurality of QpMap values for the neural network to learn and filter the input frame to the neural network;

wherein obtaining the QP scaling factor by adjusting the plurality of input QP values related to the input frame comprises:

obtaining a scaled QP step size by performing a subtraction or an addition on a corresponding QP input value, wherein the scaling operation of Qp step size is equivalent to the subtraction or addition operation of the corresponding QP input value; and obtaining the QP scaling factor based on the scaled QP step size.

15. The non-transitory computer readable storage medium of claim 14, wherein adjusting the plurality of input QP values related to the input frame comprises:

obtaining a QP offset based on a QP offset step size, a lower bound, and an offset index, wherein the QP offset step size is a step size for adjusting each input QP value, the lower bound is an integer value determining a maximum QP value reduction, and the offset index is a signaled index value; and subtracting the QP offset from a QP input value.

16. The non-transitory computer readable storage medium of claim 15, the method further comprising:

signalling, by an encoder, the QP offset step size, the low bound, and the offset index, wherein the offset index is an integer between 0 and 3.

17. The non-transitory computer readable storage medium of claim 15, the method further comprising:

predefining, by an encoder, the QP offset step size and the low bound; and signalling, by the encoder, the offset index, wherein the offset index is an integer between 0 and 3.

* * * * *